(12) United States Patent
Nelson et al.

(10) Patent No.: US 10,888,794 B1
(45) Date of Patent: Jan. 12, 2021

(54) ENHANCED AMUSEMENT VEHICLES AND A METHOD FOR SIMULATING POWER-UPS IN-GAME VIRTUAL VEHICLE ENHANCEMENTS AND VIRTUAL WEAPONRY FOR IMPROVED RACE EXPERIENCE

(71) Applicant: EMOTIONAL IDEAS INC., Cordova, TN (US)

(72) Inventors: Joshua Jermaine Nelson, Cordova, TN (US); Joseph M. Giannuzzi, Cedar Park, TX (US); Quintus William McKeel, Cordova, TN (US)

(73) Assignee: EMOTIONAL IDEAS, INC., Cordova, TN (US)

( * ) Notice: Subject to any disclaimer, the term of this patent is extended or adjusted under 35 U.S.C. 154(b) by 0 days.

(21) Appl. No.: 17/031,796

(22) Filed: Sep. 24, 2020

Related U.S. Application Data

(60) Provisional application No. 62/905,388, filed on Sep. 25, 2019.

(51) Int. Cl.
*A63G 25/00* (2006.01)
*B60R 11/04* (2006.01)
(Continued)

(52) U.S. Cl.
CPC .............. *A63G 25/00* (2013.01); *B60Q 9/00* (2013.01); *B60R 11/0229* (2013.01);
(Continued)

(58) Field of Classification Search
CPC ...... A63G 25/00; B60Q 9/00; B60R 11/0229; B60R 11/04; B60R 2011/001; B60R 2011/004; B60R 2011/008; B62D 1/046
(Continued)

(56) References Cited

U.S. PATENT DOCUMENTS 6,269,291 B1 * 7/2001 Segeren .............. G05D 1/0261
701/25

FOREIGN PATENT DOCUMENTS

JP       07227481     *   1/1995

* cited by examiner

*Primary Examiner* — Gertrude Arthur Jeanglaude
(74) *Attorney, Agent, or Firm* — Hulsey P.C.

(57) ABSTRACT

An amusement vehicle, retrofittable hardware gamification attachment, and method for simulating power-ups in-game virtual vehicle enhancements and virtual weaponry for improved racing experience are disclosed. Amusement vehicle comprises sensor-specific transmitters/receivers for communicating with other amusement vehicles moving in amusement environment. Amusement vehicle comprises a processor simulating power-ups in-game virtual vehicle enhancements and virtual weaponry based on sensor-specific signals transmitted to or received from other amusement vehicles. Power-ups and virtual weaponry are simulated by increasing/decreasing speed, causing damage, providing temporary protection from damage, freezing weaponry, and deactivating weaponry the amusement vehicle for pre-defined time corresponding to sensor-specific signals transmitted to or received from other amusement vehicles in gaming event of amusement environment. Amusement vehicle comprises cameras for capturing still images/video of amusement vehicle and surroundings. An adaptive video system (AVS) processes, transmits, and displays still images/video on a display screen of amusement vehicle and display device external from amusement environment.

20 Claims, 20 Drawing Sheets

(51) Int. Cl.
 *B60R 11/02* (2006.01)
 *B60Q 9/00* (2006.01)
 *B62D 1/04* (2006.01)
 *B60R 11/00* (2006.01)

(52) U.S. Cl.
 CPC .............. *B60R 11/04* (2013.01); *B62D 1/046* (2013.01); *B60R 2011/001* (2013.01); *B60R 2011/004* (2013.01); *B60R 2011/008* (2013.01)

(58) Field of Classification Search
 USPC .......................................................... 701/2
 See application file for complete search history.

Mr.Troll

Score: 80 points
Game: 52
Position: 2nd place

Player Stats

Turbotron Battle Race
6/10/2020  8:30:16 PM

Vital Damage Stats          *

Land Mines Triggered    12
Laser Turrets            9
Oil Slick                6

Powerups Acquires           *

Laser Turrets            5
Speed Boost              4
Oil Stick                2
Shield                   6
Freeze Ray               3

Tier Rank
520 Gold Status

TurboTron Battle Racing Battle Stat sheet

Race Rankings

| Rank | Name | Score |
|---|---|---|
| 1 | Lulgi | 100 |
| 2 | Terminator | 80 |
| 3 | Jeff Gardon | 60 |
| 4 | MadMax | 40 |
| 5 | Peach | 20 |
| 6 | Bladerunner | 0 |
| 7 | Crash | -10 |
| 8 | Ironman | -20 |
| 9 | Jasmine | -30 |
| 10 | Mr.Troll | -40 |

National Rankings

| Rank | Name | Score |
|---|---|---|
| 1 | Lulgi | 5000 |
| 2 | Terminator | 4880 |
| 3 | Toes | 4800 |
| 4 | MadMax | 4678 |
| 5 | Peach | 4512 |
| 6 | Bladerunner | 4300 |
| 7 | Crash | 3890 |
| 8 | Ironman | 3500 |
| 9 | Jasmine | 3200 |
| 10 | Princess | 3020 |

FIG.10

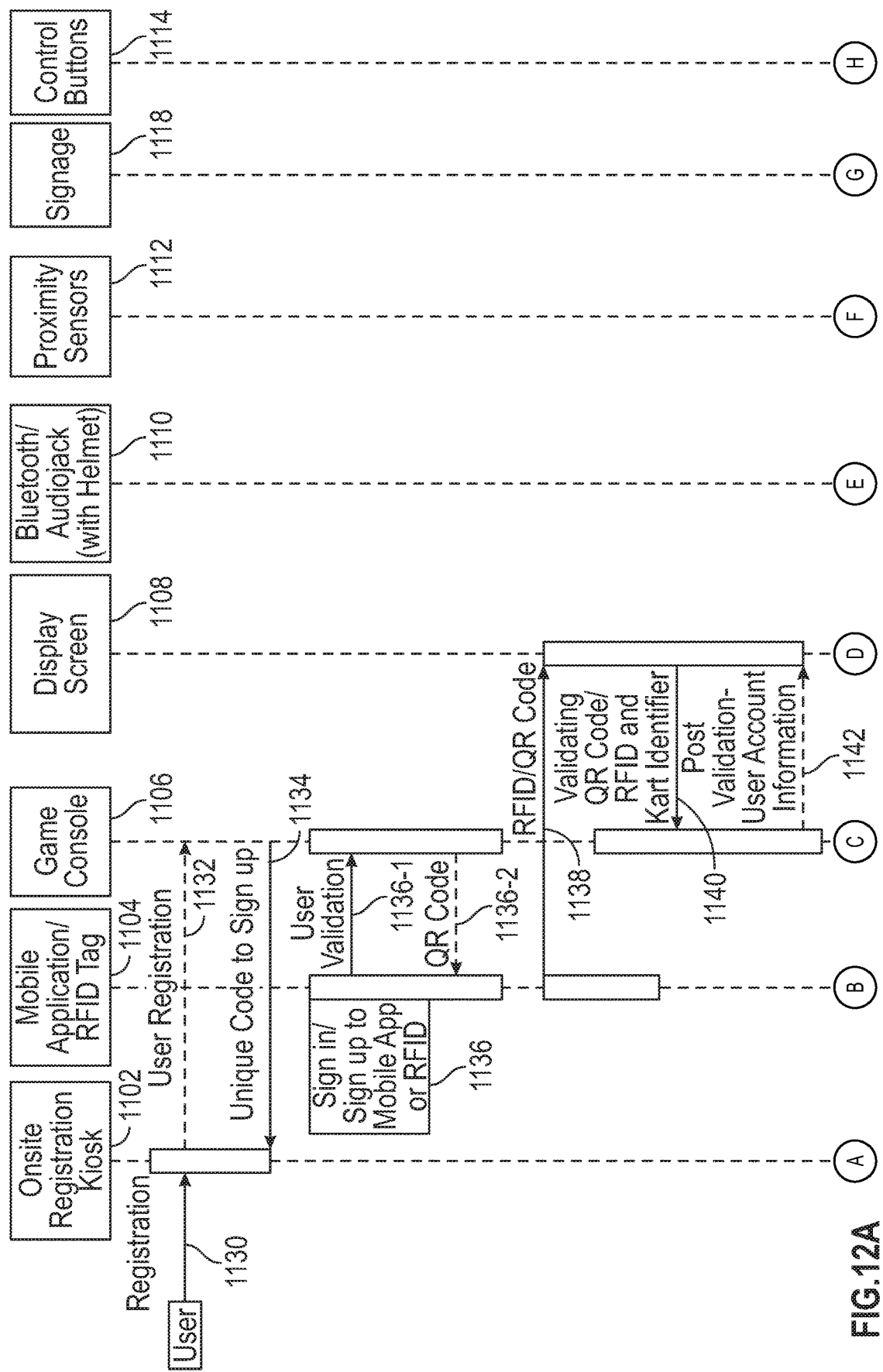

ENHANCED AMUSEMENT VEHICLES AND A METHOD FOR SIMULATING POWER-UPS IN-GAME VIRTUAL VEHICLE ENHANCEMENTS AND VIRTUAL WEAPONRY FOR IMPROVED RACE EXPERIENCE

RELATED APPLICATIONS AND CLAIM FOR PRIORITY

The present application claims priority from U.S. Provisional Patent Application Ser. No. 62/905,388, titled "Amusement Vehicles and A Method for Simulating Power-Up and Weapons for Improved Race Experience," filed Sep. 25, 2019, which is incorporated herein by its entirety and referenced thereto.

FIELD OF INVENTION

The present invention relates to electronically powered amusement, sports, or professional vehicles combined with the tracks or courses and amusement vehicle environments. More particularly, the present invention relates to amusement vehicles, retrofittable hardware gamification attachment for amusement vehicles, and a method for simulating power-ups in-game virtual vehicle enhancements and virtual weaponry for improved racing experience. The amusement vehicles simulate gaming power-ups, weaponry, in-game Heads Up Display (HUD) information, (e.g., a digital transparent image projected above a dashboard displaying information appearing below on the dashboard) as well as both local and remote live streaming of amusement vehicles such as go-karts, Segways, bump-karts, amusement boats, and the like, for improving race experience.

BACKGROUND OF INVENTION

It is known that people often visit amusement parks and theme parks during their leisure time. Typically, the amusement parks include attractions, rides, and other events to cater to people of different age groups. Children and adults alike enjoy amusement rides using amusement vehicles such as but not limited to Go-Karts or other electronically powered, "user-controlled" and/or partially "remotely controlled" devices which could be further expanded with "features" to enrich the experience.

Examples of such features include, but are not limited to; camera/s for live-action, "Adaptive Video Streaming" or "Adaptive Video System" (AVS) for use in live playback or time-shifted playback. These video streams could be utilized in such examples of current devices that could be retro-fitted by way of a "kit" or solution are not limited to; Segway's, Bump-Karts, amusement boats, and the like, as they provide excitement and thrill during the ride. Motor Sports have long been enjoyed by both children and adults, due to the excitement, thrills, and rush of being so aerodynamic and low to the ground thus allowing a rider and racer to push themselves and their machine to the limit, outpacing, out-maneuvering, and out-racing competition for the victory.

Kart racing or karting is a variant of open-wheel motorsport with small, open, four-wheeled vehicles called karts, go-karts, e-karts, or gearbox/shifter karts depending on the design. They are usually raced on Scaled-down circuits. Karting is commonly perceived as the stepping stone to the higher and more expensive ranks of motorsports. In addition, with the ever-increasing sophistication of entertainment provided by home Video games, arcade games, motion pictures, and amusement park rides, attractions, and the emerging "E-Sports" leagues there is a need for an improved/visually rich karting live-action racing/gaming experience affording for a greater level of excitement, thrill level, skills and levels of immenseness. gaming competition can be achieved. This while providing for a visually rich, interactive spectator experience.

With the introduction and growth of "E-Sports", there is a demand for innovative competitive entertainment that enhances the traditional industry of karting and combines it with the attributes and skills-based approach of the interactive competitive video gaming experience.

As for example, Battle Kart, a company from Belgium, also disclosed a karting game to recreate video games such as Mario Kart (Nintendo™) and Crash Team Racing (PlayStation®). The system used by Battle Kart requires video projections on the grounds of a karting track, of virtual "elements" and of real "elements". Thus, the system proposed by Battle Kart allows for interactions between the drivers/players (i.e., between the kart vehicles) and the "elements" (virtual or not) that are projected on the track. The system proposed by Battle Kart is thus based on the projection of the object on the ground, on localization equipment (such as a GPS), and a server. This setup for recreating a real-life Mario Kart race or a real-life Crash Team Racing race would be difficult and expensive to integrate on already established karting tracks around the globe as it would require introducing a complex system (i.e., which includes a screen or projection/s surrounding the tracks to show the "elements" to the drivers/players and a GPS localization system in communication with a "Local" and/or "Peer To Peer" node servers to identify the position of each one of the drivers/players that are on the track) to existing setups. Additionally, as this system requires the presence of a screen/s surrounding the track, it would be hardly implementable on outdooring karting recreation centers.

Therefore, the need for a visually rich, skilled-based complex racing/gaming solution portraying simulated "Power-Ups" weapons, the damage remains and needs to deliver a high grade of "low" "latency" gamification for amusement vehicles and amusement environments.

An example of an amusement vehicle configured with the simulated weapons is disclosed in a United States Publication No. 20150041230 (Abandoned), entitled "Amusement Vehicle, Amusement Environment for a Vehicle and Method of Using the same" (the "'230 Publication"). The '230 Publication discloses a kit for installing on an amusement vehicle having a chassis, a set of wheels and a motor the amusement vehicle for interacting with at least one other amusement vehicle in an amusement environment, the kit comprising: at least one of: a receiver to be mounted on the chassis for receiving a first directional signal from the at least another amusement vehicle only when the at least another amusement vehicle is in substantial alignment with the applicable receiver and a transmitter type/s to be mounted on the chassis for transmitting a second directional signal to one of the at least another amusement vehicle in substantial alignment with the transmitter; and a controller to be mounted on the chassis and to be at least one of: operably connected to the receiver and to be configured to decode the first signal for controlling the motor in accordance with instructions included in the first signal; and operably connected to the transmitter and to be configured to encode the second signal prior to sending it to the at least another amusement vehicle via the transmitter. In an embodiment, the concept of virtual "Power-Ups" (i.e.

rewards. privileges, etc.) may be awarded, earned, or granted and then enabled in the amusement vehicles and the track as in many traditional competitive video games, whereby, the user at the beginning of the game may have a given amount of powers (or none), and the powers may be lost or gained throughout the game in accordance with the performance. The powers may be used to perform one or more of the following: accelerating own vehicle, decelerating own vehicle and/or other vehicles, stop other vehicles, decelerate all other vehicles, cause an accident, etc.

In the present scenario, the transmitter and the receiver may be used for transmitting and/or receiving powers from or to another vehicle, or from an interacting element or decelerating interacting elements, accelerating interacting elements, or random interacting elements.

The above type of amusement ride/shooting "kit" is successful at identifying a basic and direct way of introducing a modern video game simulation of virtual "Power-Ups" on an amusement vehicle. However, by a simple and solely mounting transmitter, a receiver, and a controlling motor on an amusement vehicles chassis that only responds to speed up and slow down commands signals has its certain limitations, therefore still remaining potential various gaming and interactive sensory features that have yet to be introduced into the field are awaiting riders in search of challenging and innovative improvements in the field of amusement vehicles.

It is understood and observed that a more immersive visual and sensory-rich experiences can be derived consisting of but not limited to intelligent remote control by way of the "Wireless Command & Control" system alternatively call the "backbone" of such features by way of proprietary algorithms sent/received through a dedicated interface and/or a sub-channel of the wireless command and control system.

SUMMARY

It is one of the objects of the present invention to provide an advanced hardware and software gaming solution for simulating in-game virtual vehicle enhancements and virtual weaponry for improved competitive race experience through a complete retrofittable after-market body frame fitting attachment, master control gaming software, and a pairing mobile application interface as a complete package kit for amusement vehicles.

In order to achieve the object, the present invention provides a technical feature in which each of the amusement vehicles on a track includes an agnostic retrofittable hardware gamification attachment body fitting for amusement vehicles for simulating in-game vehicle enhancements and virtual weaponry, upgrades, and powerups for improved race experience.

In one implementation, each of the amusement vehicles on the track includes sensor-specific transmitters and sensor-specific receivers. For example, the sensor-specific transmitters and receivers include "Optical", "Ultra-Sonic", "Proximity" sensors. The sensor-specific transmitters and sensor-specific receivers transmit and receive sensor-specific signals from other amusement vehicles. After transmitting or receiving the sensor-specific signals to other amusement vehicles from an amusement vehicle, a simulated power-up and weapon get activated. The simulated power or weapon may include, but not limited to, "turbo boost", "vortex shield", "LASER turret blasters", "oil slick", "freeze ray cannon", "rage", and "power-ups". The simulated power-up and weapon increases or decreases the speed of the amusement vehicle or grants a special ability to the amusement vehicle for a predefined time. For example, "oil Slick" allows a player to have temporary access to a rear-view split-screen on a display monitor attached to frame fitting or chassis, allowing a unique way to view amusement vehicles present behind, without having to turn around. Each of the players in a gaming event tries to gain an advantage during the game by obtaining a maximum number of simulated power-ups and weapons.

In another technical feature of the present invention, the track includes Radio-frequency identification (RFID) tags at various locations. The RFID tags act as landmine obstacles and simulate damage or pitfall for the amusement vehicle when the amusement vehicle runs over an RFID tag. This ensures a more competitive racing experience as it forces the players to be more aware of the track up ahead.

In another technical feature of the present invention, the amusement vehicle includes the steering wheel having control buttons. The player operates the control buttons to activate the simulated power-up and weapons.

In yet another technical feature of the present invention, each of the amusement vehicles includes a display screen. The display screen mounts to the steering wheel. The display screen shows the real-time position of each player, simulated power-ups and weapons, targeting tracking warnings, and other notifications. Based on the information displayed and/or notified to the player, the player maneuvers the amusement vehicle to avoid other amusement vehicles and races ahead on the track avoiding the RFID landmines to gain an advantage in the race. The display screen includes a dynamic mount that allows the display screen to face the driver at the same level in his view. The dynamic mount connects and justifies the majority of the weight by positioning lower than the centerline of the steering wheel. This creates a pendulum effect and keeps the display screen at the display surface level.

In yet another technical feature of the present invention, the amusement vehicles connect communicatively to a master control system using wireless communication techniques such as Wi-Fi. The master control system controls each of the amusement vehicles via a processor. The processor in each of the amusement vehicles works as a wireless command and control system and acts as their backbone. The master control system obtains data corresponding to each of the amusement vehicles, the real-time position of each of the amusement vehicles, and simulated power-up and weapons obtained. Further, the master control system routes all communication between the amusement vehicles in the track. Further, the master control system displays results of the gaming event on a display device/signage placed outside of the track.

In addition, the master control system tracks and processes performance of all players participating in the gaming event and generates reports to award points and rank the players according to either in-game or post-game metrics.

In yet another technical feature of the present invention, the master control system fetches and streams live feed data from cameras (the 2D camera and the 3D 360-degree camera) mounted on each amusement vehicle attachment frame fitting or display screen and displays at a display device placed at a lobby outside the track, or through the internet on different platforms such as social media and mobile applications. Amusement vehicle includes an Adaptive Video System" (AVS). AVS processes images and/or video received from cameras and displays at the display screen and transmits it to any number of display devices (not specifically shown) placed outside the track e.g., in a lobby i.e. "Leader Board". For instance, the processor along with AVS processes live feeds of the images or video as being captured cameras and displays the images or live feed/s on any number display devices. This provides a differentiated, uniquely curated visual, social media, and live-action racing/gaming experience for spectators and/or those viewing via a social media channel/s to see how a player is doing while racing. For example, the driver uses the display screen mounted on the steering wheel, and the spectator uses his phone interface or a spectator kiosk, respectively to view the player's live feed. As such, the present invention provides improved race experience for players and spectators.

In yet another technical feature of the present invention, the amusement vehicles attachment can wirelessly communicate, connect, and assign a player's personal profile via a mobile application designed for mobile devices to pair and assign a rider's personal profile account to an amusement vehicle as a means of identifying, tracking and storing specific in-game date to the master control system via a Wi-Fi signal or cellular signals of such.

In yet another technical feature of the present invention, each of the amusement vehicles includes a display screen. The display screen shows information such as, but not limited to players' selfie account photo, real-time position of each player, simulated power-ups and weapons, targeting tracking warnings, and other in-game vital notifications and statistics such as current health, bonus attributes, armor level, ammunition count, lap times, vehicle diagnostics or settings, etc.

Based on the information displayed and/or notified to the player, the player maneuvers the amusement vehicle to avoid other amusement vehicles and race ahead on the track avoiding the RFID landmines that simulate harm or damage to the amusement vehicle potentially causing a rider to lose advantage in the race.

In yet another technical feature of the present invention, each of the amusement vehicles includes an attachable custom the ergonomic steering wheel that mimics the ergonomics of both a console gaming controller and racing the steering wheel comprising of Front-facing and rear-facing buttons, triggers, and switches that activate and confirms or denies in-game actions. The steering wheel is designed to pair with both the master control system and attachment frame fitting of the amusement vehicle and houses various components such as a Bluetooth signal transmitter or haptic vibrations based on in-game feedback. Amusement Vehicle attachment can connect to a Bluetooth Signal transmitter allowing audio feedback to any pairing audio headset compatible to the amusement vehicle attachment.

In yet another technical feature of the present invention, each of the amusement vehicles includes audio and visual notification not only on the display screen but also on through exterior rear, head, and body lights of the body frame fitting of the amusement vehicle. These visual lights built into the exterior of the amusement vehicles frame create a more safe and challenging racing experience by displaying various color combinations, patterns, or strobe in accordance to specific in-game powerup actions or effects. Amusement vehicle displays yellow lights after the amusement vehicle has received an optical transmission from a powerup that simulates the effect of slowing down or green lights as an amusement vehicle increases in speed, or red lights when an amusement vehicle comes to a complete stop.

In yet another technical feature of the present invention, the amusement vehicle can have haptic vibration sensory in both or either the steering wheel or attached to the seat for vibration feedback from in-game effects, power-ups, or simulated damage.

Features and advantages of the subject matter hereof will become more apparent in light of the following detailed description of selected embodiments, as illustrated in the accompanying FIGS. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the FIGUREs and examples are not meant to limit the scope of the present invention to a single embodiment, but other embodiments are possible by way of interchange of some or all of the described or illustrated elements and, further, wherein:

FIG. 10 illustrates a representative exemplary interface 1000 displaying game statistics, in accordance with one embodiment of the present invention;

Figure 14:
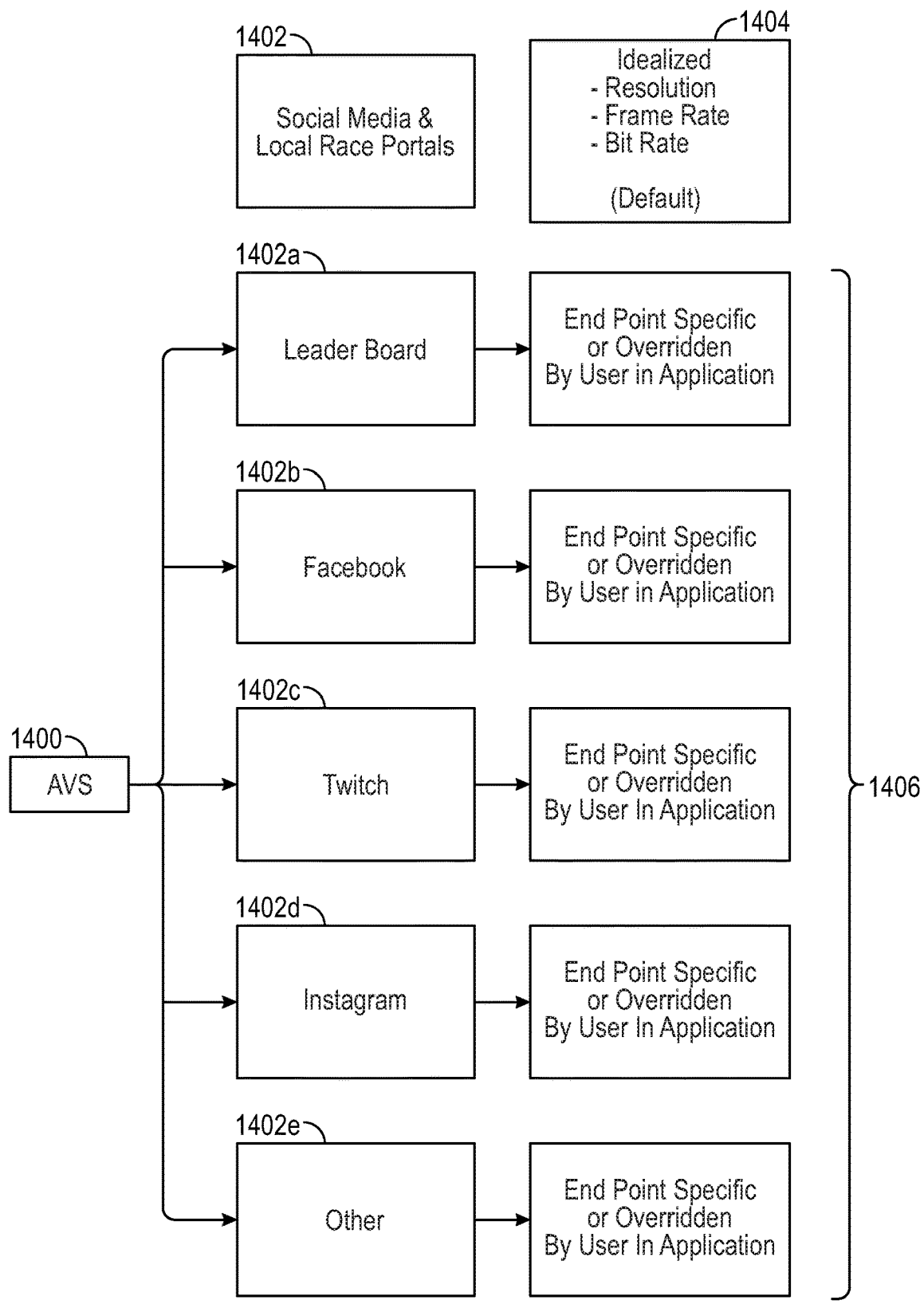
Figure 15:
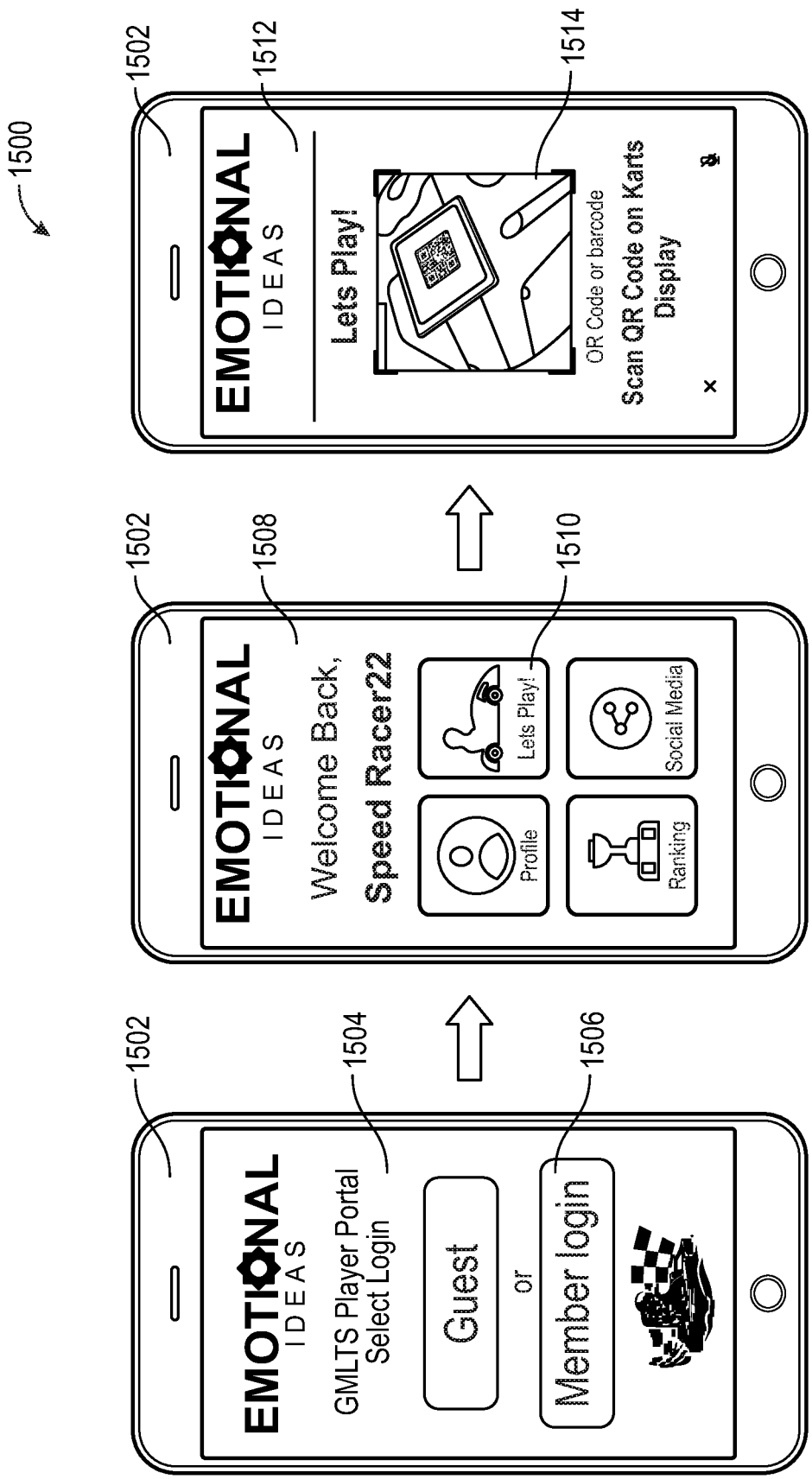
Figure 16:
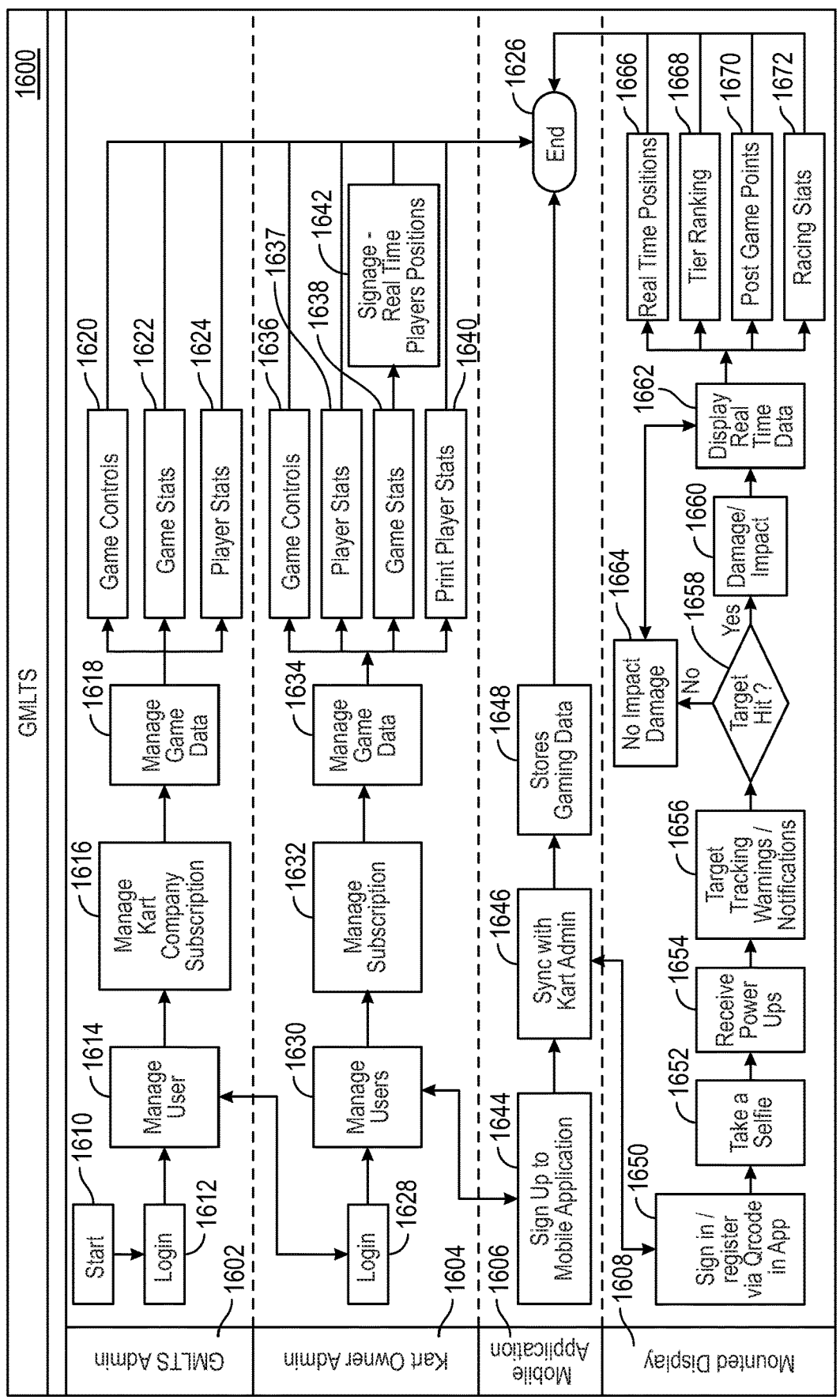

as well as the "manually" or "programmatically" generated interrupts that will change camera view based on the interrupt type, in accordance with one embodiment of the present invention;

FIG. 14 illustrates a programmatic flow of an Adaptive Video System (AVS), in accordance with one embodiment of the present invention;

FIG. 15 illustrates a process flow of user accessing gaming event via an electronic device such as a mobile phone, in accordance with one exemplary embodiment of the present invention; and FIG. 16 illustrates an overall process flow of the Go-Kart Mobile Laser Tag System (GMLTS), in accordance with one exemplary embodiment of the present invention.

It will be noted that throughout the appended drawings, like features are identified by like reference numerals.

DETAILED DESCRIPTION OF THE EMBODIMENTS

Before the present working principle of a method for simulating "Power-Ups" and weapons using amusement, vehicles are described, it is to be understood that this disclosure is not limited to the particular system or method for achieving so, as described, since it may vary within the specification indicated. Various processes and functions for simulating "Power-Up" modes, weapons, targeting, tagging, etc. using amusement vehicles for improved race experience might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It should be understood that the present invention describes agnostic retrofittable hardware gamification attachment that can be integrated in existing amusement vehicles. Alternatively, the agnostic retrofittable hardware gamification attachment might be provided with new amusement vehicles. Hereinafter, the embodiments are described considering amusement vehicles that include the agnostic retrofittable hardware gamification attachments. Operation and advantages of operating such amusement vehicles are now described.

Figure 1:
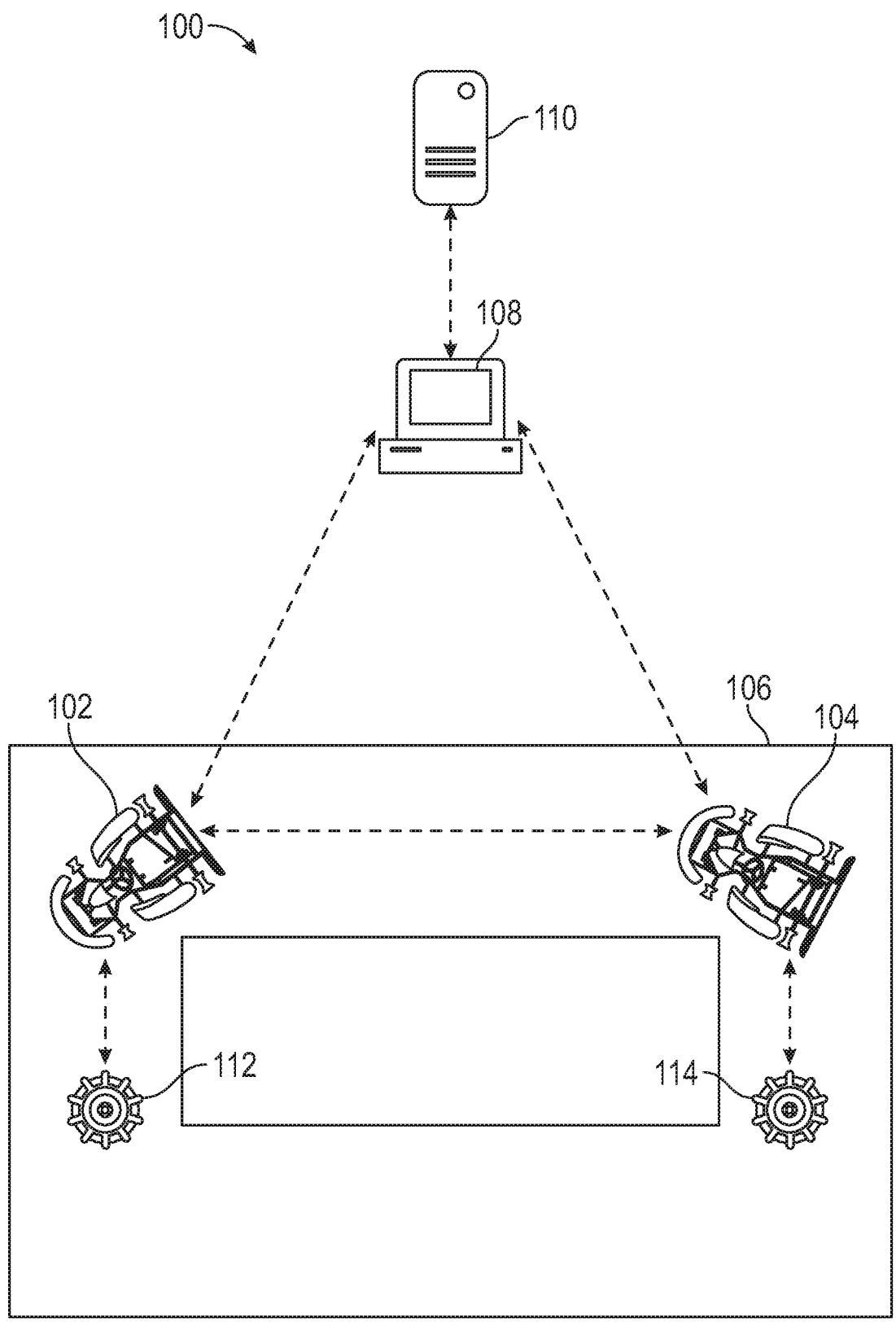
FIG. 1 illustrates an amusement environment comprising amusement vehicles, in accordance with one embodiment of the present invention.

FIG. 1 shows amusement environment 100 including amusement vehicles 102, 104, in accordance with one working embodiment of the present invention. Amusement vehicles 102, 104 may include, but not limited to, go-karts, Segway's, bump-karts, amusement boats, etc. For ease of explanation, go-karts are illustrated and described in preferred embodiments; however other vehicles such as motorbikes, vehicles such as cars and All-Terrain Vehicles (ATVs) may also be implemented as the amusement vehicles.

Amusement vehicles 102, 104 travel on track 106, in that a player rides an amusement vehicle around track 106 during a race/gaming event. It should be understood that there could be more than two amusement vehicles at a time on the track/course. Each of the amusement vehicles 102, 104 uniquely identifies with an "identification number" or "code" that can be scanned and/or registered via a mobile application (FIG. 15) by way of Bluetooth or other wireless means in combination with proprietary software algorithms. In a given embodiment, this registration process can be enabled when the driver approaches a particular amusement vehicle and could be triggered by a dedicated "Proximity" sensor. The "Proximity" sensor would carry a unique ID so that the participant's phone/mobile is tied to a given amusement vehicle. The same technique can be used by the participant if they were to register via a kiosk. In the present invention, two amusement vehicles are illustrated for the purpose of explaining the constructional features of the amusement vehicles and simulating "Power-Ups" and weapons or targeting and the associated notification to the kart being targeted as well as tagging modes using the amusement vehicles. For ease of understanding, amusement vehicles 102, 104 are referred to as first amusement vehicle 102 and second amusement vehicle 104. First amusement vehicle 102 indicates an amusement vehicle that is traveling ahead or in front of the second amusement vehicle 104 on track 106. Alternatively, second amusement vehicle 104 may be referred to as a follower amusement vehicle 104 as it is following or behind first amusement vehicle 102 on track 106.

Each of first amusement vehicle 102 and the second amusement vehicle 104 includes processor 302. Processor 302 works as a wireless command and control system and acts as a backbone for each of first amusement vehicle 102 and second amusement vehicle 104. Processor 302 of each of first amusement vehicle 102 and second amusement vehicle 104 communicates with master control system 108 through a network. The network includes a wireless network implemented using Wi-Fi, Bluetooth, NFC, and/or other protocols. Further, first amusement vehicle 102 and second amusement vehicle 104 communicate with each other via master control system 108.

Further, processor 302 and master control system 108 communicates with a remote "local", and/or "peer-to-peer node" server 110. As such, remote server 110 implements as a cloud or "local" independent server and/or in combination with a "peer-to-peer node" server, consisting one of a desktop, a tablet, or any other electronic device that is used to operate in conjunction with the "processor 302 and master control system 108. Remote server 110 instructs processor 302 and master control system 108 to operate and communicate with first amusement vehicle 102 and second amusement vehicle 104. Remote server 110 instructs processor 302 and master control system 108 in combination with a dedicated wireless transmitter, receiver, and command module for the applicable sensor type. Remote server 110 instructs processor 302 and master control system 108 to enable various race modes of operation, timed or manual interrupts such as triggering on-course events, (i.e. "Slow-Downs" or "Stop Mode" for safety reasons, "Landmine" zones, targeting, and special race "Zone Activations". The feature of "interrupts" is explained with the help of FIG. 13.

Figure 2A:
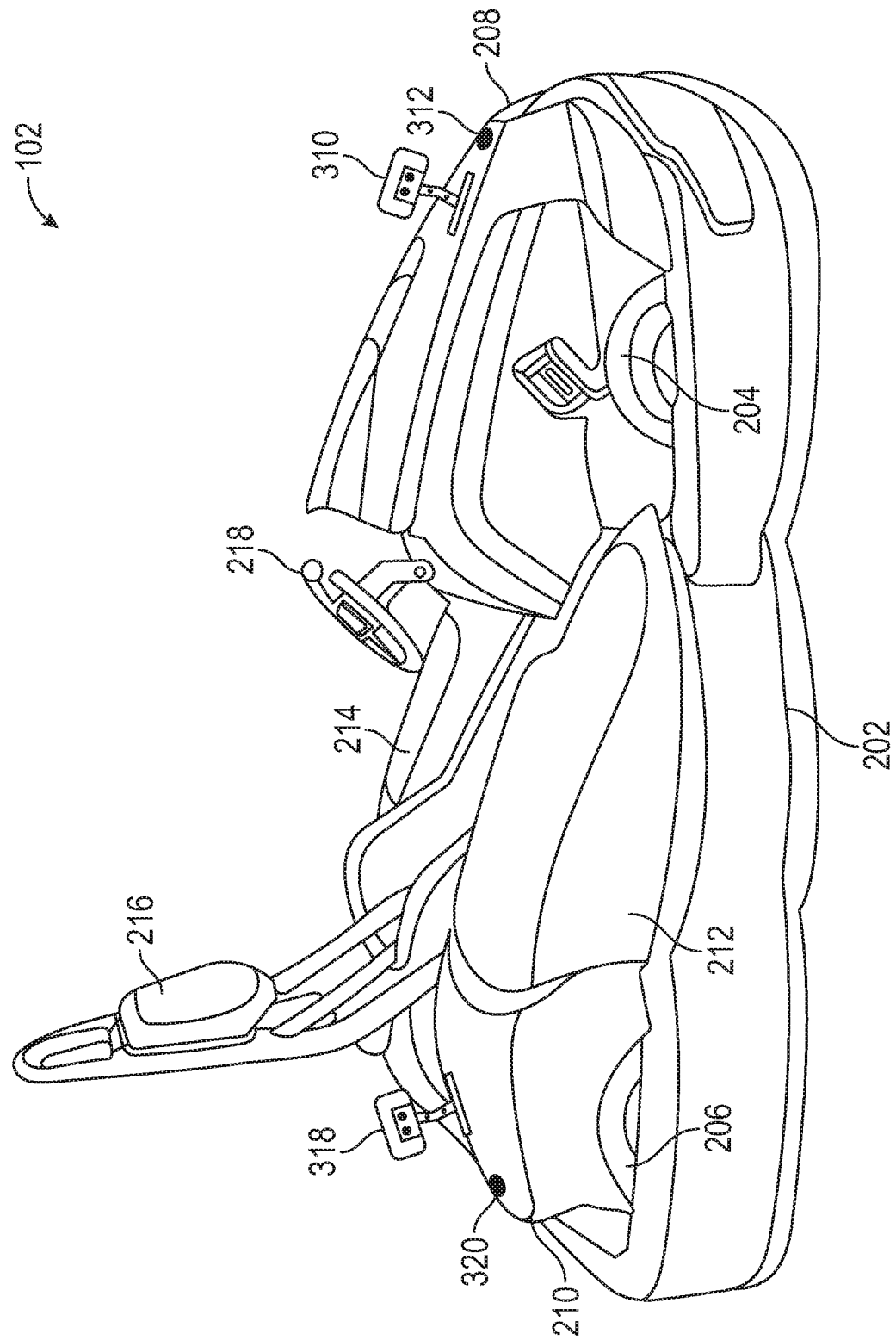
FIGS. 2A, 2B, and 2C illustrate a perspective, front and rear view of the amusement vehicle, respectively, in accordance with one embodiment of the present invention.
Figure 2B:
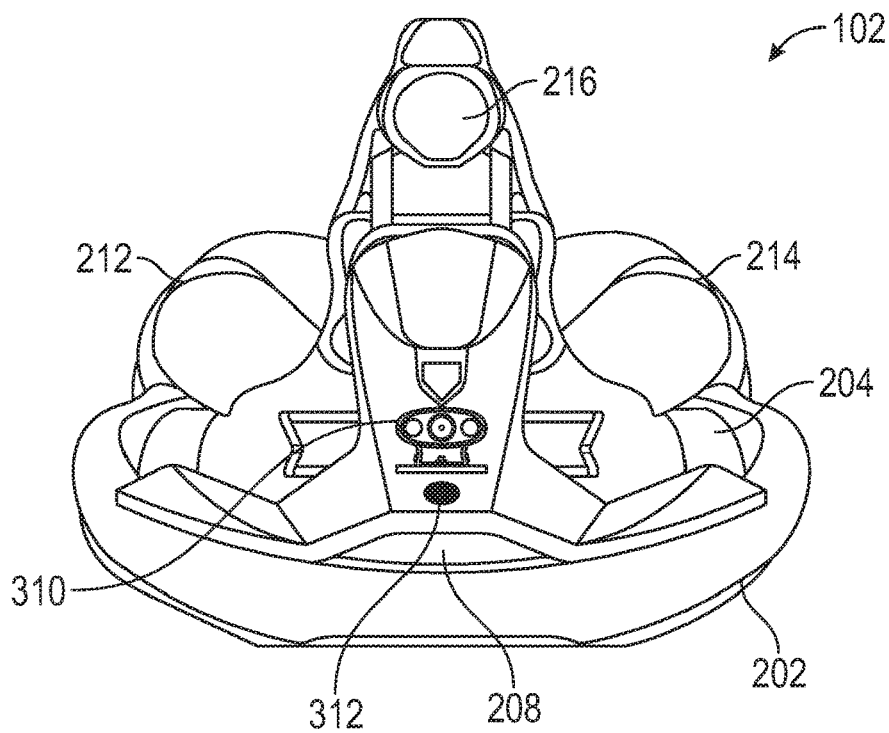
Figures 2C, 2D:
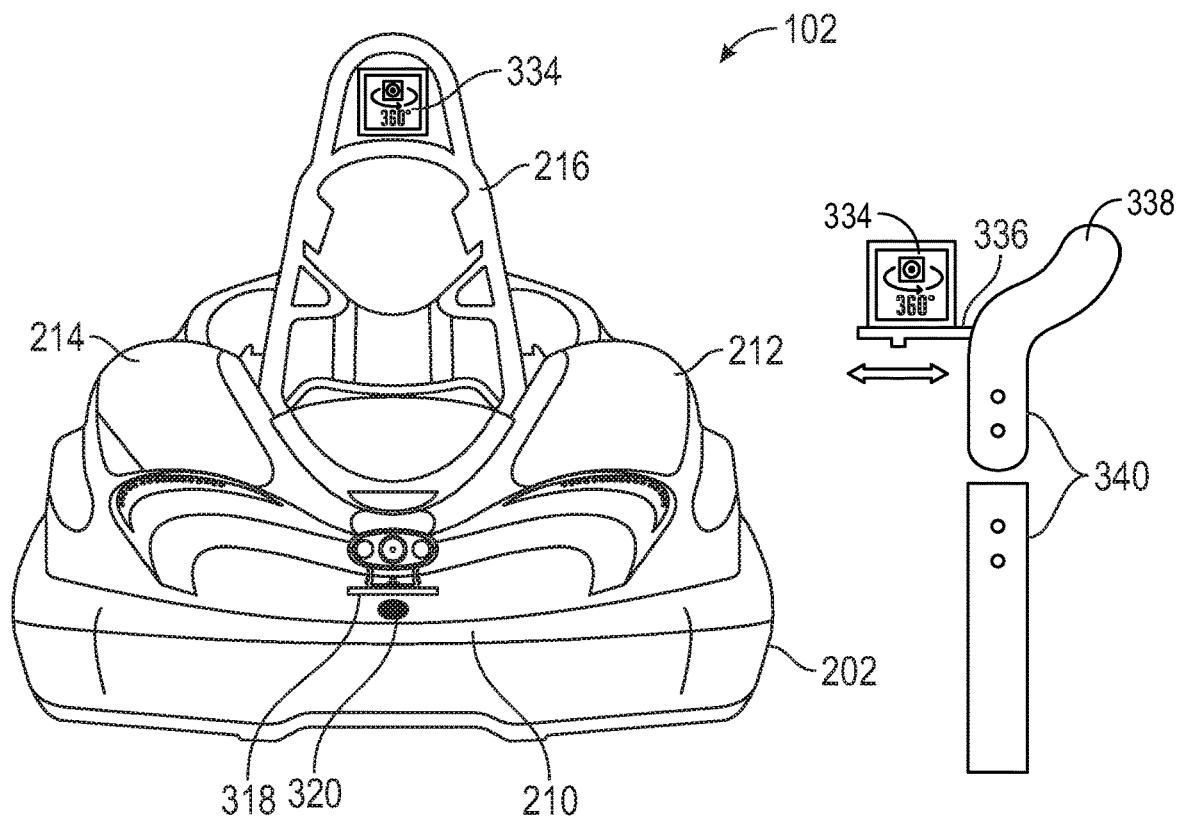
FIG. 2D illustrates the second camera i.e., 3-dimensional (3D) 360-degree camera mounting system, in accordance with one embodiment of the present invention.
Figure 3:
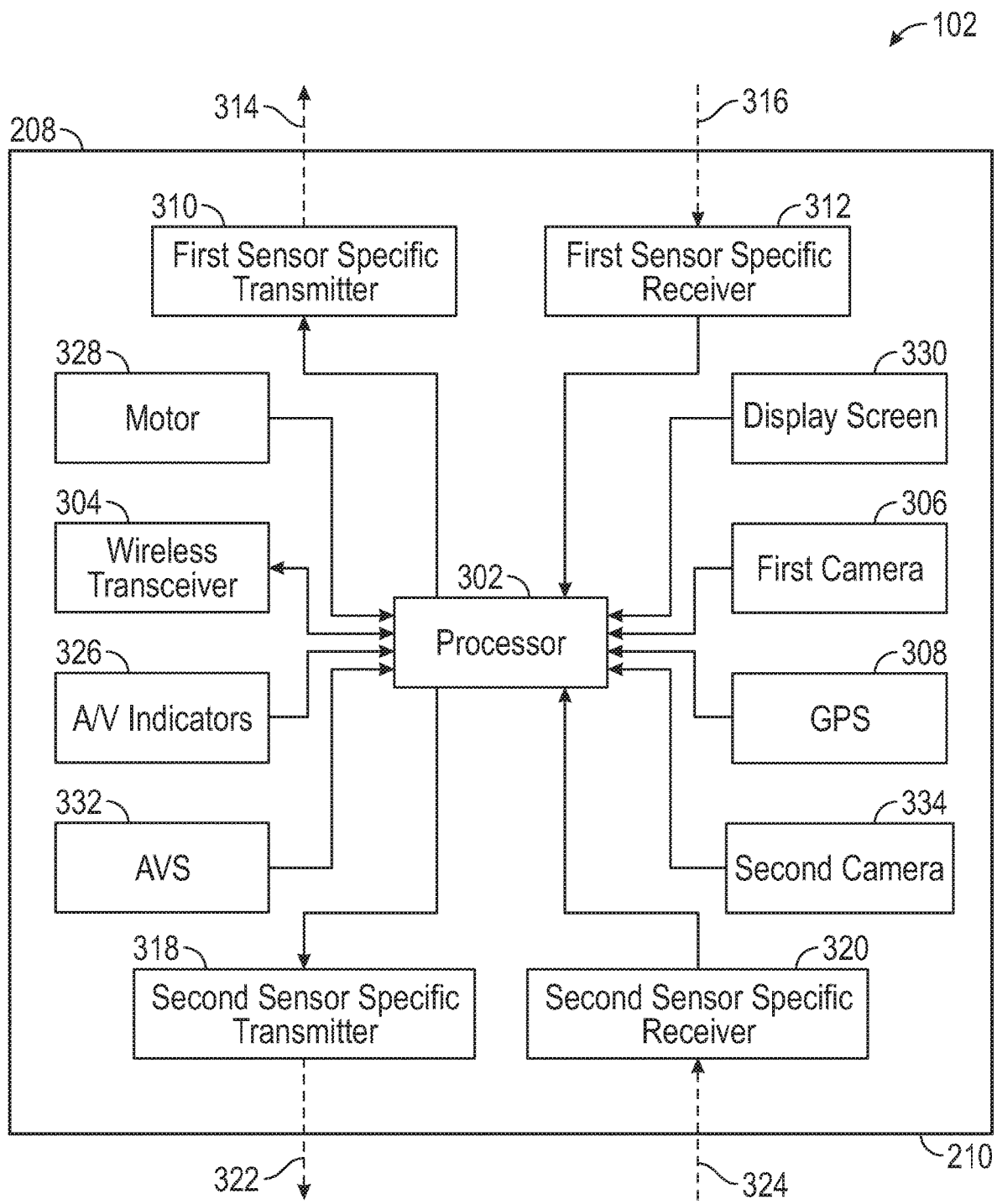
FIG. 3 illustrates a block diagram of the amusement vehicle, in accordance with one embodiment of the present invention.

FIGS. 2A through 3 show the amusement vehicle. It should be understood that FIGS. 2A, 2B, 2C, and 3 are used to explain first amusement vehicle 102, as such second amusement vehicle 104 too will have similar features to perform various functions by processor 302 and to communicate with master control system 108 and remote server 110. As can be seen, FIGS. 2A, 2B, and 2C show a perspective, front and rear view of first amusement vehicle 102, respectively. First amusement vehicle 102 includes a chassis (not shown). Frame housing 202 covers the chassis of first amusement vehicle 102 and withstands impact on first amusement vehicle 102 when first amusement vehicle 102 hits a barrier (not shown) put around track 106.

First amusement vehicle 102 includes front wheels 204 and rear wheels 206 mounted to the chassis that allow maneuvering first amusement vehicle 102 on track 106. First amusement vehicle 102 provides front bumper 208 and rear bumper 210 that mount to frame housing 202. Front bumper 208, rear bumper 210, and frame housing 202 provides a material made of polycarbonate or rubber material or any other suitable material. Front bumper 208, rear bumper 210, and frame housing 202 design provides structural integrity in that they take impact on first amusement vehicle 102 and reduce vibrations caused to a rider or player riding first amusement vehicle 102. First amusement vehicle 102 further includes first side pod 212 and second side pod 214. First amusement vehicle 102 encompasses first side pod 212 on its right side and second side pod 214 is on its left side.

Further, first amusement vehicle 102 provides seat 216 for allowing the player to sit and ride first amusement vehicle 102. First amusement vehicle 102 includes steering wheel 218 for maneuvering first amusement vehicle 102 along track 106.

FIG. 3 shows a block diagram of first amusement vehicle 102, in accordance with one embodiment of the present invention. FIG. 3 illustrates the electronic components embodied into first amusement vehicle 102 for allowing the player to simulate the power-ups and weapons with second amusement vehicle 104 and to communicate with master control system 108 and remote server 110.

First amusement vehicle 102 includes a processor 302. As specified above, processor 302 works as a wireless command and control system and acts as a backbone for first amusement vehicle 102. Processor 302 processes instructions stored in a memory (not shown). First amusement vehicle 102 includes a wireless transceiver 304 electrically connected to processor 302. Wireless transceiver 304 communicates with processor 302 and remote server 110. Further, wireless transceiver 304 communicates with second amusement vehicle 104 and other objects such as Radio-frequency identification (RFID) tags, Proximity sensors, Motion sensors, Ultra-Sonic sensors or combinations of sensor types placed on track 106 at strategic locations during the race via processor 302. Processor 302 communicates and controls the various devices and sensors on the track and sensors present in first amusement vehicle 102.

First amusement vehicle 102 encompasses a first camera 306 such as a 2-dimensional (2D) camera configured to capture still images and/or a video. First camera 306 captures still images or live during the race. In one example, steering wheel 218 encompasses first camera 306 at the center facing the player. First amusement vehicle 102 further provides second camera 334 such as a 3-dimensional (3D) 360-degree camera. Second camera 334 rotates and captures still images and/or a video. FIGS. 2C and 2D show mounting of second camera 334. Second camera 334 mounts to bracket 336 that in turn mounts to frame 338 and an attachment or roll cage assembly 340. Bracket 336 allows for robust mounting of second camera 334. Bracket 336, frame 338, and roll cage assembly 340 allow for clear, unobstructed views, e.g. front, sides and rear while protecting the second camera 334 even in the event of a roll-over of amusement vehicle 102. First camera 306 and second camera 334 electrically or wirelessly connect to processor 302. In one specific example, first camera 306 and/or second camera 334 captures an image of the player being seated on seat 216. After capturing, processor 302 registers the image of the player. When the player sits on seat 216, first camera 306 generates an interrupt triggering the start of the default "Camera Cycled Views" (FIG. 12) overridden only by way of a higher priority trigger event. Additionally, it prompts the driver to have first camera 306 integrated or positioned in or near steering wheel 218 to take his photograph. Subsequently, first camera 306 and/or second camera 334 transmit the image to processor 302 for processing, registering the participant, and/or posting to the image to the "Battel Board"/"Score Board" or display device placed outside of track 106.

First camera 306 and second camera 334 employ proprietary algorithms to capture still or live video content and transmit to "Adaptive Video Stream" or "Adaptive Video System" (AVS) 332. AVS 332 in conjunction with processor 302 processes by dynamically parsing the captured images and videos (front, side, rear, or combination of views) and delivers all images and video feeds to and from the amusement vehicles and to the various remote display devices such as the "Leader Board", "Battle Board" and/or any intended end-point display devices (FIG. 14 illustrates a programmatic flow of AVS 332).

Processor 302 registers the image of the player with a radio-frequency identification "RFID" tag or automatically generated ID/code issued for the player. The "RFID" tag or automatically generated ID/code allows to identify the player by his name, age, etc. After registering the player, processor 302 in conjunction AVS 332 displays the name, image of the player to audience, on a "Leader Board", "Battel Board" or other display device placed inside or outside of track 106.

In one alternative embodiment, first camera 306 mounts on the bumper and second camera 334 mounts above the driver head i.e., on a roll bar. First camera 306 when placed at the rear bumper 210 captures still images or videos of the following amusement vehicle triggered by "Manual" or "Programmatic" generated interrupts, (FIG. 13) i.e., second amusement vehicle 104 and shows it to the player on a display screen. As such, the player need not have to turn behind to check the amusement vehicles following him.

In one alternative embodiment, the player registers using other means, such as scanning of a "Quick Response" (QR) code displayed on a portable electronic device (not shown) present with the player and upon receiving a secure pin from the player.

In another embodiment, the player registers using another means, such as using a mobile application to activate a dedicated "Proximity" sensor (not shown). The proximity sensor generates a forced trigger event that would automatically register the driver to the amusement vehicle.

First amusement vehicle 102 includes a location sensor such as a Global Positioning System (GPS) 308 for determining the location of first amusement vehicle 102 on track 106.

First amusement vehicle 102 includes first sensor-specific transmitter 310 and first sensor-specific receiver 312. In one implementation, first sensor-specific transmitter 310 and first sensor-specific receiver 312 mounts on front bumper 208. First sensor-specific transmitter 310 transmits sensor-specific signals 314 to amusement vehicles present in front of first amusement vehicle 102. First sensor-specific receiver 312 receives sensor-specific signals 316 from the other amusement vehicles that are in front of first amusement vehicle 102.

First amusement vehicle 102 includes second sensor-specific transmitter 318 and second sensor-specific receiver. 320. In one implementation, second sensor-specific transmitter 318 and second sensor-specific receiver 320 mount on rear bumper 210 of first amusement vehicle 102. Second sensor-specific transmitter 318 transmits sensor-specific signals 322 to other amusement vehicles present behind first amusement vehicle 102 i.e., to second amusement vehicle 104. Second sensor-specific receiver 320 receives sensor-specific signals 324 from second amusement vehicles 104 behind first amusement vehicle 102.

In one embodiment, first sensor-specific receiver 312 fixedly mounts to front bumper 208, and second sensor-specific receiver 320 fixedly mounts to rear bumper 210 of first amusement vehicle 102. Further, first sensor-specific transmitter 310 mounts on front bumper 208, and second sensor-specific transmitter 318 mounts on rear bumper 210 as rotatable attachments. In one exemplary implementation, steering wheel 218 provides one or more control buttons (explained in subsequent paragraphs). The one or more control buttons allow to control the direction of first optical transmitter 310 and second optical transmitter 318 to aim at sensor-specific receivers of other amusement vehicles, for simulating shooting or power-ups and weapons at them.

Figure 4:
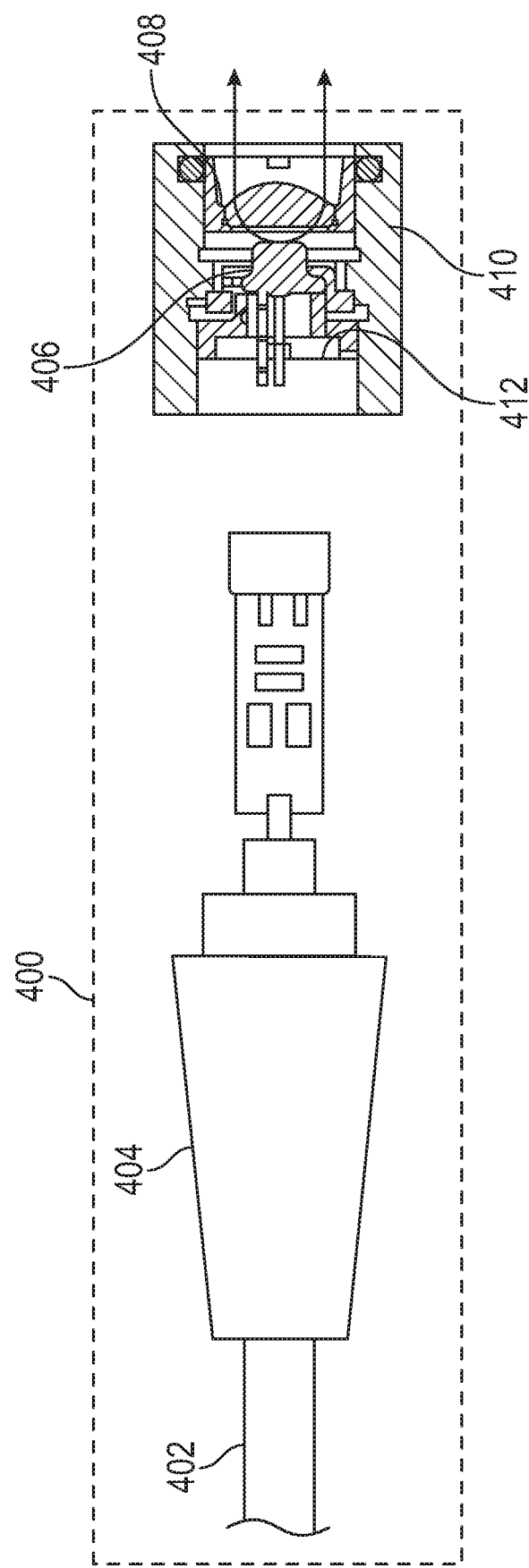
FIG. 4 illustrates an optical transmitter, in accordance with one embodiment of the present invention.

FIG. 4 shows the setup of sensor-specific transmitter 400, in accordance with one exemplary embodiment of the present invention. Sensor-specific transmitter 400 generally refers to first sensor-specific transmitter 310, first sensor-specific receiver 312, second optical transmitter 318, and second sensor-specific receiver 320. Sensor specific transmitter 400 utilizes a shielded cable 402 for receiving power from a power source. Shielded cable 402 encompasses in a strain relief segment 404. Power carried by shielded cable 402 is provided to a sensor-specific circuitry (not shown). The circuitry includes a sensor-specific signal-generating element, such as Light Amplification by Stimulated Emission of Radiation (Laser) diode 406 or some other sensor-specific device. The example based on a laser diode 406 is used for its ability to travel long ranges without getting scattered. Another suitable sensor in place of a laser diode may also be used. Further, laser diode 406 provides an optical element such as lens 408. Collimation tube 410 or similar mechanism specific to the sensor type surrounds laser diode 406 or alternative sensor type device. Lens 408 and collimation tube 410 or similar sensor-specific mechanisms narrow down (aligning in a direction of transmission) a beam generated by the laser diode 406. A retaining ring (not shown) helps to retain or hold laser diode 406 and lens 408 in collimation tube 410. Further, optical circuitry includes an Electrostatic discharge (ESD) circuit 412 for preventing any electrical damage due to static charge. As described above and here within, the design is not specifically based on the use of a given technology or sensor type. Sensor such as the "Ultra-Sonic" type sensor could be integrated and uniquely customized to accomplish the task.

Figure 5:
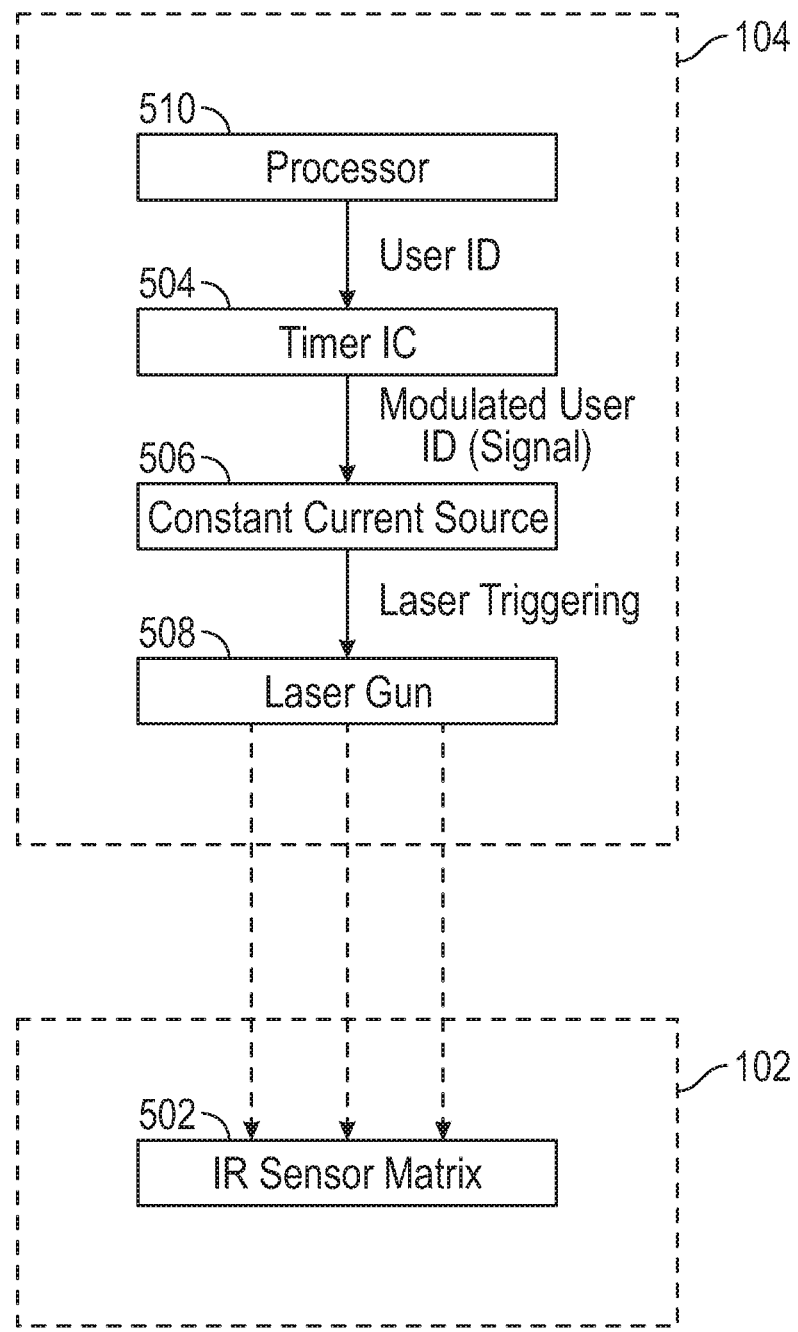
FIG. 5 illustrates a process of generation of optical signals for transmission from one amusement vehicle to another, in accordance with one embodiment of the present invention.

FIG. 5 shows a process of generation of optical signals for transmission from one amusement vehicle to another, in one accordance with one embodiment of the present invention. In one case, second amusement vehicle 104 aims at a second sensor-specific receiver 320 installed on rear bumper 210 of first amusement vehicle 102, to simulate shooting. Here, second sensor-specific receiver 320 is shown as being implemented as an Infrared (IR) or "Ultra-Sonic" 502. Processor and/or control module/s 302 in second amusement vehicle 104 provides a signal to a timer Integrated Circuit (IC) 504. The signal provided to timer IC 504 includes a User Identify (UID) of the player driving second amusement vehicle 104. Timer IC 504 modulates the UID and sends a modulated UID, as a signal, to a constant current source 506. Constant current source 506 triggers first sensor-specific transmitter 310 mounted on front bumper 208 of second amusement vehicle 104. In the current embodiment, first sensor-specific transmitter 310 is illustrated as being implemented using a "Turret Blaster" gun 508. Thus, laser or "Ultra-Sonic" pulses produced by second amusement vehicle 104 are configured to transmit towards the applicable receiver matrix 502 of first amusement vehicle 102. The "laser" or "Ultra-Sonic" sensor type pulses received by the applicable sensor matrix 502 of first amusement vehicle 102 simulates a successful hit of first amusement vehicle 102 by second amusement vehicle 104.

Subsequently, the modulated UID present in the "Laser" or the "Ultra-Sonic" pulses gets decoded to identify the player registered with second amusement vehicle 104. Such information helps to determine points gained by second amusement vehicle 104 and to simulate damage caused to first amusement vehicle 102, during the game. Here, directing optical or sensor-specific signals 314 transmitted by first optical transmitter 310, and optical signals 322 transmitted by second optical transmitter 318 to optical receivers of the other amusement vehicles help to simulate shooting of the other amusement vehicles. Further, optical or sensor-specific 314 & 322 help to simulate the damage caused to the other amusement vehicles that received optical or sensor-specific 314 & 322. Similarly, optical or sensor-specific signals 316 received by first sensor-specific receiver 312 and optical or sensor-specific signals 324 from other amusement vehicles help to simulate the shooting of first amusement vehicle 102 by the other amusement vehicles. This helps to simulate damage caused due to the shooting by the other amusement vehicles on first amusement vehicle 102.

In one exemplary embodiment, first sensor-specific receiver 312 and second sensor-specific receiver 320 get deactivated temporarily e.g., 10 seconds for simulating an effect of a "shield" in which first amusement vehicle 102 does not receive shooting from the other amusement vehicles. Shield power acquired during the game or race is explained in the later part of the description.

In an alternative embodiment, usage of the "ultra-sonic" transmitter/receiver sensor configuration in place of optical transmitter and receiver helps to detect, tag, and identify an amusement vehicle and game-related actions, i.e. "Power-Ups", damage, etc. Placing an "ultra-sonic" matrix, consisting of between 2-6 sensor arrays in accordance with the transmit and receive signaling protocols at a strategic location on the amusement vehicle allows to shoot or activate "shield" during the race. Here, processor 302 embeds unique IDs and utilizes and processes the information.

First amusement vehicle 102 provides Audio-Video (A/V) indicators 326 that electrically connect or delivers by way of AVS 332. A/V indicators 326 include one or more Light Emitting Diodes (LEDs), a speaker, and "haptic actuator/s" installed on steering wheel 218 and/or body of first amusement vehicle 102. A/V indicators 326 get activated when other amusement vehicles successfully simulate hitting or shooting first amusement vehicle 102. Alternatively, A/V indicators 326 get activated when first amusement vehicle 102 gets additional powers such as "Power-Ups" after completing a certain number of hits on the other amusement vehicles. In one example, A/V indicators 326 get activated and produce an alert to indicate activation of "shield" power. As such, A/V indicators 326 alerts or notify the player of first amusement vehicle 102 of significant events occurring during the gaming event. The player then utilizes available powers to gain an advantage over other amusement vehicles.

First amusement vehicle 102 includes motor 328 that connects to processor 302 electrically. Processor 302 instructs motor 328 to operate at a defined speed to control the speed of first amusement vehicle 102. For instance, when second amusement vehicle 104 hits first amusement vehicle 102 and activates a "Temporary Slowdown" or "Complete Stop" feature on first amusement vehicle 102, then the track master power control or processor 302 instructs motor 328 to reduce the speed or stop first amusement vehicle 102 for a period of time e.g., five seconds. In one implementation, frame housing 202 includes a battery (not shown) that powers motor 328. Alternatively, motor 328 operates with the help of an engine (not shown) that runs on gasoline.

Figure 6A:
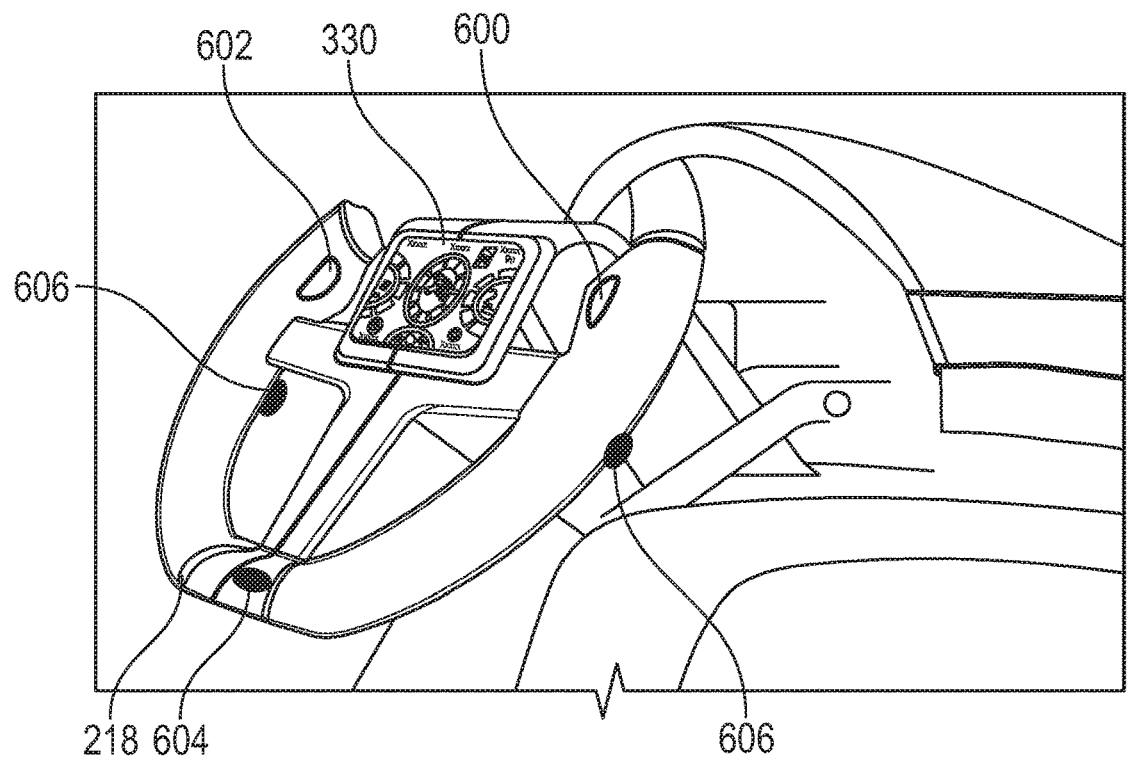
FIGS. 6A and 6B illustrate a display screen mounted at the steering wheel, in accordance with one embodiment of the present invention.
Figure 6B:
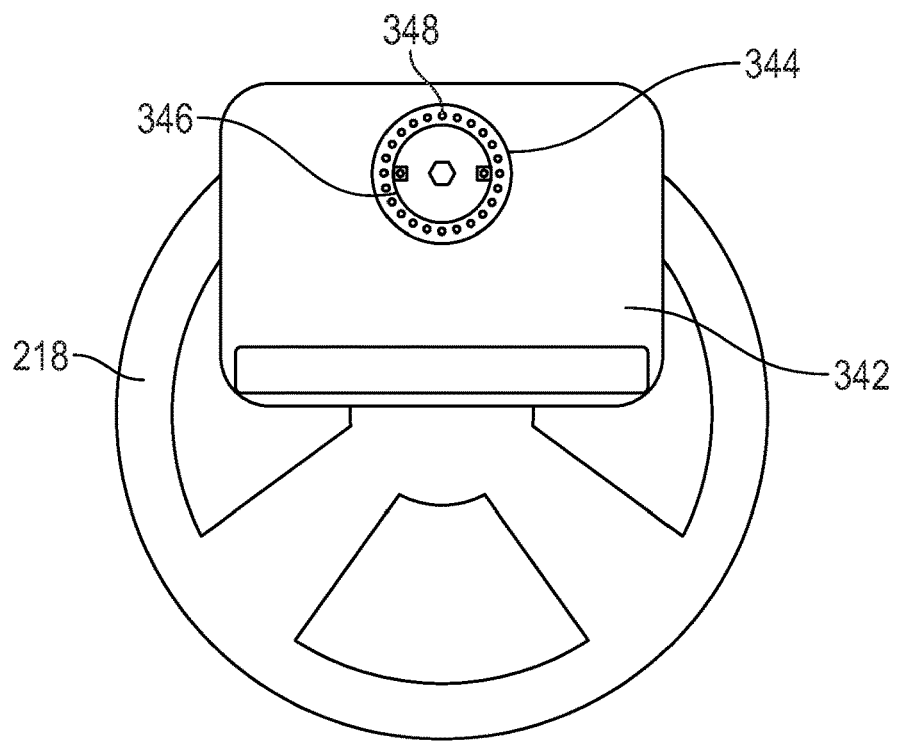

First amusement vehicle 102 includes display screen 330 that mounts to steering wheel 218 facing seat 216. Display screen 330 allows the user to input data and view information corresponding to the operation of first amusement vehicle 102 during the gaming event. FIG. 6A shows display screen 330 mounted at steering wheel 218. In the current embodiment, display screen 330 detachably mounts at the center of steering wheel 218 with the help of dynamic mount 342. FIG. 6B shows dynamic mount 342. Dynamic mount 342 indicates a plate that mounts to steering wheel 218. Dynamic mount 342 includes an outer fixed ring 344 and an inner floating ring 346. Outer fixed ring 344 and floating inner ring 346 present nested ball bearing 348. Floating inner ring 346 mounts to dynamic mount 342 that firmly holds display screen 330. Dynamic mount 342 allows to keep display screen 330, e.g. touch tablet, display, phone, etc. facing the driver always level in his view. Dynamic mount 342 adjusts its position so that the majority of the weight is positioned lower than the centerline of steering wheel 218. This creates a pendulum effect and keeps dynamic mount 342 at the same level at all times.

A person skilled in the art appreciates that display screen 330 mounts to steering wheel 218 in such a manner that rotation of steering wheel 218 to steer first amusement vehicle 102 will not have any effect on the orientation of display screen 330. In other words, display screen 330 mounts to steering wheel 218 such that the orientation of display screen 330 will not change even when steering wheel 218 is rotated to maneuver first amusement vehicle 102. Further, as display screen 330 detachably mounts to steering wheel 218, an operator will be able to remove and replace display screen 330 upon damage. In one exemplary embodiment, display screen 330 comes encased in a plastic or glass cover to protect it from damage and/or environment.

In one embodiment, steering wheel 218 includes a plurality of virtual and/or physical control buttons such as a haptic feedback control 600, a control button 602, a trigger button 604, and targeting buttons 606, as shown in FIG. 6A. Haptic feedback control 600 allows enabling and disabling of haptic feedback actuators, such as piezo actuators, integrated within the steering wheel 218. Haptic feedback actuators provide vibrational feedback to the player in response to "Power-Ups" received or damage taken by the first amusement vehicle 102, during the game.

Control button 602 allows activation of the Bluetooth transmitter. Upon activation, the Bluetooth transmitter establishes a connection with a Bluetooth assembly of a helmet (not shown) worn by the player while riding first amusement vehicle 102. Upon such connection, audio data gets transmitted from an audio device, such as a headset, attached to the helmet. As each of the players is provided with the helmets, each player transmits or receives audio information from other amusement vehicles e.g., second amusement vehicle 104.

The virtual and/or physical control button 604 allows the user to activate various "Power-Ups" and weapons. Although a single trigger button 604 is illustrated in FIG. 6A, a person skilled in the art appreciates that multiple trigger buttons placed at different positions on steering wheel 218 allow activating different "Power-Ups" and weapons.

Steering wheel 218 includes targeting buttons 606 underneath or at one of its sides. In one exemplary implementation, targeting buttons 606 is placed to allow the player to hold steering wheel 218 and operate targeting buttons 606 with his index or middle fingers. When activated, targeting buttons 606 trigger a target assistance program configured in the processor 302 to produce a visible "Laser" or "Ultra-Sonic" beam. The player then uses targeting buttons 606 to adjust the position of the visible "Laser" or "Ultra-Sonic" beam to aim at the amusement vehicle ahead or behind first amusement vehicle 102. Alternatively, upon triggering targeting buttons 606 and additional sensor type/s assist to aim at other amusement vehicles. In one case, targeting buttons 606 include four buttons for shifting an aim upwards, downwards, right, or in the left direction. A person skilled in the art will appreciate that multiple targeting buttons, placed at different positions of steering wheel 218, help to adjust the position and direction of the "Laser" or "Ultra-Sonic" pulses.

In one alternate embodiment, a joystick (not shown) replaces targeting buttons 606. The joystick operates similar to a gearshift rod in a motor vehicle and helps to adjust the position and direction of the "Laser" or "Ultra-Sonic" beam.

Additionally, steering wheel 218 presents other buttons at appropriate positions for accessing settings menu options and scrolling through the menu options to perform one or more operations.

In one exemplary embodiment, amusement vehicles 102, 104 provide improved race experience for the players during the gaming event. For example, amusement vehicles 102, 104 provide improved race experience in "Recreational" & "Pro Series" game versions. Amusement vehicles 102, 104 provide improved race experience with simulated "Powers-Ups". The simulated "Powers-Ups" may include, but are not limited to, "Hyper Boost", "Vortex Shield", "Turret Blasters", "Trunk Buster", "Freeze Ray Cannon", "Landmine", "Battle Rage", or "Pre-Designated" zones, "Obstacles", "Hot", "Mine Sweeper". A person skilled in the art understands that processor 302 virtually simulates the aforementioned "Power-Ups" in each of amusement vehicles 102, 104. Further, "RFID" tags 1104 or "Proximity Sensor" enabled "Landmine", track specific "Hot" zones or "Pre=Designated" zones/obstacles are placed at various locations on track 106, help to simulate damage to amusement vehicle 102, 104 when amusement vehicles 102, 104 runs over "RFID" tag 1104 or another sensor type.

"Hyper Boost" is an automatically generated, granted simulated "Power-Up". In "Hyper Boost" power-up, amusement vehicle 102 gets a minor, temporary increase in speed for a pre-defined time e.g., three seconds. After completion of the predefined time, processor 302 reduces the speed of the motor to normal operating speed. In one implementation, master control system 108 or processor 302 awards "Hyper Boost" simulated "Power-Up" randomly to some or all of amusement vehicles 102, 104 presents in track 106. Upon activation, display screen 330 provides an audio alert and A/V indicators 326 notify the player. Further, display screen 330 shows a visual countdown to deactivate the "Hyper Boost" simulated "Power-Up" such as 3 . . . 2 . . . 1 to ensure that the player is aware of the "Hyper Boost" received by him.

"Vortex Shield" is an automatically generated, granted simulated "Power-Up". In "Vortex Shield" power-up, amusement vehicle 102 gets temporary protection from all damage. Here, first sensor-specific receiver 312 and second sensor-specific receiver 320 get temporarily disabled for a pre-defined time e.g., five seconds. When "Vortex Shield" gets activated, processor 302 simulates an act of protection or invulnerability. In one case, when the "Vortex Shield" gets activated or deactivated, A/V indicators 326 provide an audio alert and display screen 330 displays a notification as "Shield acquired" or "Shield disabled". Further, display screen 330 shows a visual countdown to deactivate the "Vortex Shield" simulated power-up such as 5 . . . 4 . . . 3 . . . 2 . . . 1.

"Turret Blasters" is a granted simulated "Power-Up", and provides the ability to shoot the opponents ahead of the amusement vehicle granted with "Power-Up" resulting in a temporary slowdown effect. Once "Turret Blasters" get activated, following amusement vehicles such as second amusement vehicle 104 shoots/transmits infrared lasers or other type sensor signals such an "Ultra-Sonic" beams at first amusement vehicle 102. Specifically, second amusement vehicle 104 transmits infrared lasers to the sensor-specific receiver placed at the rear bumper 210 of first amusement vehicle 102. This causes the first amusement vehicle 102 to simulate a hit or damage taken resulting in first amusement vehicle 102 to decrease its speed and slow down to the speed at which first amusement vehicle 102 is traveling for a pre-defined time e.g., three seconds. After expiry of the pre-defined time, first amusement vehicle 102 returns (regains) to the normal operating speed. In one case, when the "Turret Blasters" simulated "Power-Up" gets activated, A/V indicators 326 provide an audio alert to notify the player such as "Turret Blasters" acquired or "Turret Blasters" disabled. Further, display screen 330 shows a visual countdown to deactivate "Turret Blasters" simulated "Power-Up" such as 3 . . . 2 . . . 1.

"Trunk Buster" is a granted simulated "Power-Up". "Trunk Buster" allows the amusement vehicle that is ahead to shoot the opponent in the rear with the assistance of the targeting camera systems resulting in a temporary slowdown effect. "Trunk Buster" gets enabled by way of transmitting the applicable "Laser" or "Ultra-Sonic" signal/s at the following amusement vehicle that is behind e.g., second amusement vehicle 104. Here, the "Lasers" or "Ultra-Sonic" signal is transmitted to the applicable receiver placed at front bumper 208 of second amusement vehicle 104 causing second amusement vehicle 104 to simulate hit or damage taken resulting in second amusement vehicle 104 temporarily decreasing in speed for a pre-defined time e.g., three seconds. After completion of the pre-defined time, second amusement vehicle 104 returns to normal operating speed. In one case, when the "Trunk Buster" gets activated, A/V indicators 326 provide audio to notify the player such as "Trunk Buster" acquired or "Trunk Buster" disabled. Further, display screen 330 shows a visual countdown to deactivate the "Turret Blasters" simulated power such as 3 . . . 2 . . . 1.

An "Electro-Magnetic Pulse" (EMP) event, is a granted simulated "Power-Up" and refers to an action initiated by the driver/player when in close proximity, (i.e. within a given maximum radius) to other amusement vehicles, be it in front, along-side and/or behind his amusement vehicle. When initiated, the other amusement vehicle/s (say second amusement vehicle) that is near the amusement vehicle/s (say first amusement vehicle) gets the "Power-Up" and simultaneously and temporarily slows down. Mounting various sensor arrays, i.e. "Laser", "Ultra-Sonic", "Proximity" and/or "Optical" type sensors on all sides of the amusement vehicles alerts the driver/player that he can initiate an "EMP" Event." The player generates an interrupt by touching a virtual or physical button, which triggers the "EMP" event. The "EMP" event affects other amusement vehicles and slows them down or shuts them down completely for a predetermined period of time e.g., 3 seconds.

"Freeze Ray Cannon" is a granted simulated "Power-Up", which allows shooting the amusement vehicles ahead of the amusement vehicle such that the amusement vehicle ahead will momentarily or completely stop for a period of time before being able to proceed. Consider that second amusement vehicle 104 gets "Freeze Ray Cannon". Second amusement vehicle 104 shoots or transmits "Lasers", "Ultra-Sonic" and/or "Optical" pulse at first amusement vehicle 102. The infrared "Laser", "Ultra-Sonic" or "Optical" pulse hits the applicable receiver placed at rear bumper 210 of first amusement vehicle 102 causing first amusement vehicle 102 to simulate first amusement vehicle 102 being frozen for a pre-defined time e.g., three seconds in which first amusement vehicle 102 decreases its speed. After expiry of the pre-defined time, first amusement vehicle 102 returns to the normal operating speed. In one case, when the "freeze ray cannon" gets activated, A/V indicators 326 provide an audio alert to notify the player such as "Freeze Ray" acquired/enabled or "Freeze Ray" disabled. Further, display screen 330 shows a visual countdown to deactivate the "Turret Blasters" simulated power such as 3 . . . 2 . . . 1.

"Mine Sweeper" is a granted simulated "Power-Up", which allows for the temporary ability to driver over and activate any dormant "Land Mine"/zone located on the track. This action results in the slowdown effect for all amusement vehicles that subsequently drive over an activated "Land Mine".

"Battle Rage" is a simulated "Power-Up", which gets awarded after surpassing 3 opponents on the track. "Battle Rage" simulated power-up allows the user to use "Hyper Boost", "Trunk Buster", "Vortex Shields" simultaneously until the "Power-Ups" get disabled.

In "Power-Ups" simulated power, each of the amusement vehicles 102, 104 that is present on track 106 gets awarded or granted with a temporary capability to increase speed after a predetermined time interval. For instance, consider the first amusement vehicle 102 gets "Power-Ups" simulated power. Subsequently, first amusement vehicle 102 speed increases for a period of three seconds at every ten seconds interval during the gaming event or race. The "Power-Ups" simulated power gets awarded randomly to some or all of amusement vehicles 102, 104 using an algorithm such that amusement vehicles 102, 104 that are trailing or in the last position will be provided with the most effective power-ups such as the "Freeze Ray Cannon" and "Speed Boost" more frequently than amusement vehicles 102, 104 that are in the lead. The "Power-Ups" simulated power gets awarded continuously every ten seconds until amusement vehicles 102, 104 that are trailing complete the race.

Based on the above, it should be clear from above that the simulated powers or weapons such as "Hyper Boost", "Vortex Shield", "Turret Blasters", "Trunk Buster", "Freeze Ray Cannon", and related "Power-Ups", are virtually simulated in the processor 302 and further communicated to the amusement vehicles during the race. In order to further improve the race experience for the players, track 106 includes simulated powers or weapons such as the "RFID" tag, "Landmine" zones, or "obstacles" placed at different places on track 106, as shown in FIG. 1. In other words, track 106 includes sensors 112, 114 such as RFIG tags placed as "Landmine" zones or other "Pre-Designated" zones to simulate damage to an amusement vehicle when an amusement vehicle, say first amusement vehicle 102 enters or runs over the sensor. When first amusement vehicle 102 enters or runs over the sensor, processor 302 decreases the speed of the first amusement vehicle 102 for a predefined time e.g., five seconds. In one case, when first amusement vehicle 102 runs over the RFID landmine 112, A/V indicators 326 provide an audio alert to notify the player such as "Warning damage taken from "Landmine" zones, and "speed restored" after five seconds elapses. Further, display screen 330 shows a visual countdown to speed restoration such as 5 . . . 4 . . . 3 . . . 2 . . . 1. By placing "RFID" tag as "Landmine"/zones 112, 114 strategically, the players are made to focus on aiming the amusement vehicles ahead or behind him and also to ride carefully to avoid running over RFID landmines 112, 114 thereby improving the race experience for the players.

Figure 7:
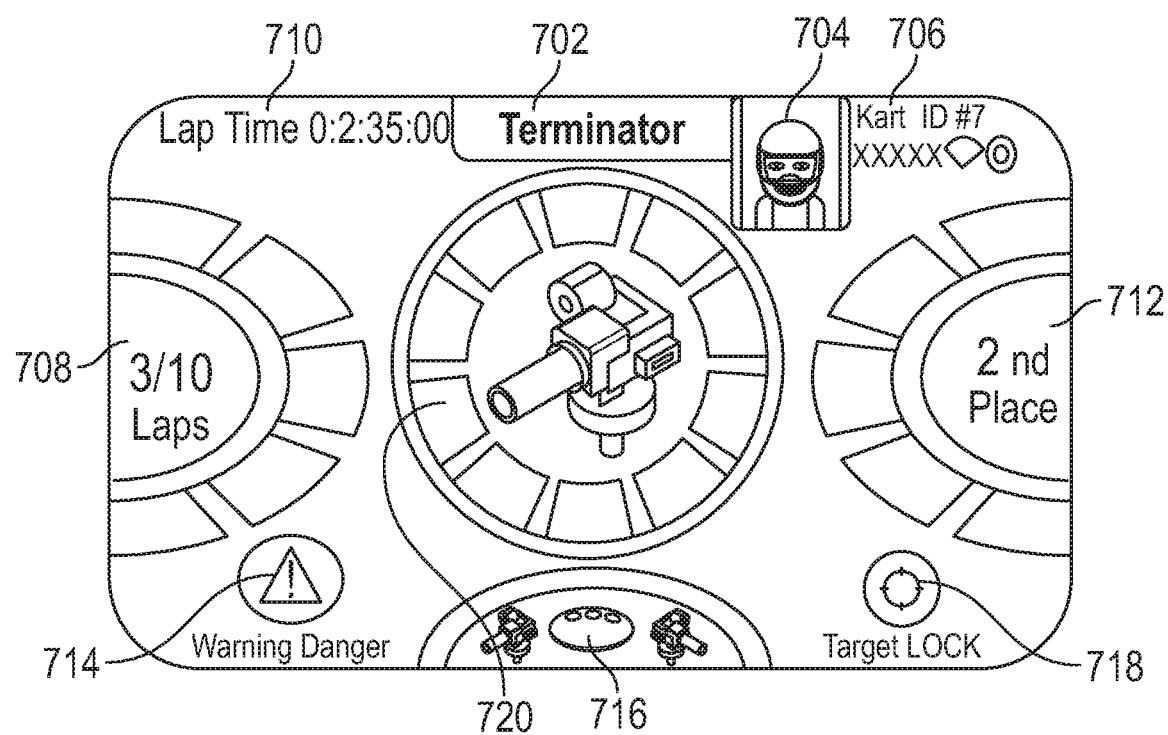
FIG. 7 illustrates an exemplary interface 700 of the display screen 330, in accordance with one embodiment of the present invention.

FIG. 7 shows an exemplary interface 700 of display screen 330. Before the race starts, display screen 330 presents in a stand-by mode. Processor 302 captures the name and nickname of the player after he registers himself with the amusement vehicle 102. Processor 302 employs first camera 306 to capture his image 704. Display screen 330 displays a unique identification number 706 of the amusement vehicle 102 and greets with a visual and/or an audio message, for example, "Hello Racer231". In order to start the race, display screen 330 displays a countdown. During the race, display screen 330 displays a current lap 708, lap time 710, and current position 712 of the player in the race. Additionally, display screen 330 displays information such as locking of amusement vehicle 102 for simulating shooting by another amusement vehicle as a warning sign 714. Display screen 330 provides visuals for selecting shooting modes 716, locking aims 718 at target other amusement vehicles, and a remaining strength 720 of the amusement vehicle 104, during the race.

In order to aim other amusement vehicles, the user selects and projects the visible light/laser beam and an infrared beam to provide a guided point of contact. The guided point of contact helps to aim first sensor-specific transmitter 310 and second sensor-specific transmitter 318. When the visible light/laser beam makes a visible contact with the optical receivers of a target amusement vehicle, a "Target locked" icon or text gets displayed on display screen 330. Warning sign 714 helps the player to understand whether the front or rear amusement vehicle is attempting to lock onto first sensor-specific receiver 312 and second sensor-specific receiver 320 of first amusement vehicle 102. The player uses the information and maneuver first amusement vehicle 102 on track.

Display screen 330 provides a real-time position of first amusement vehicle 102 in track 106, simulated power-ups, and weapons utilized. Interface 700 provides other indicators such as speedometer, temperature meter, and battery energy gauge. After the race, display screen 330 displays the present position secured by the player in the race and points awarded to the player.

Figure 8:
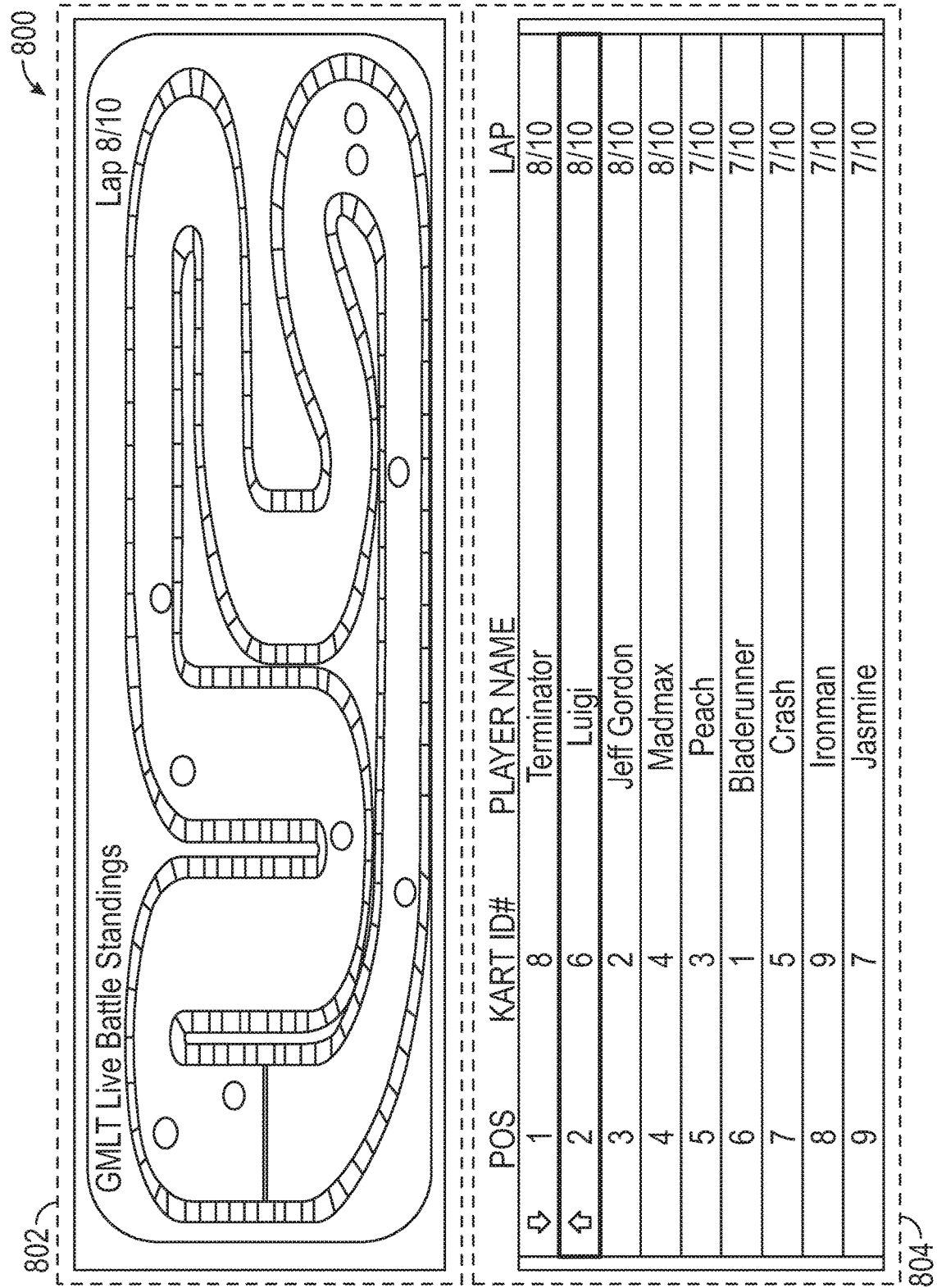
FIG. 8 illustrates a representative exemplary interface of a scoreboard providing details related to a gaming event, in accordance with one embodiment of the present invention.

FIG. 8 shows an exemplary interface 800 of a scoreboard providing details related to the gaming event. Interface 800 is divided as a first section 802 and a second section 804. First section 802 provides real-time positions of all amusement vehicles 102, 104 present in track 106. In other words, first section 802 displays the location of each of the amusement vehicles 102, 104 present in track 106. Further, second section 804 provides information regarding the number of players active in the race. For instance, second section 804 displays the names of the players, the number of laps completed by respective players, and his position in the race.

Figure 9:
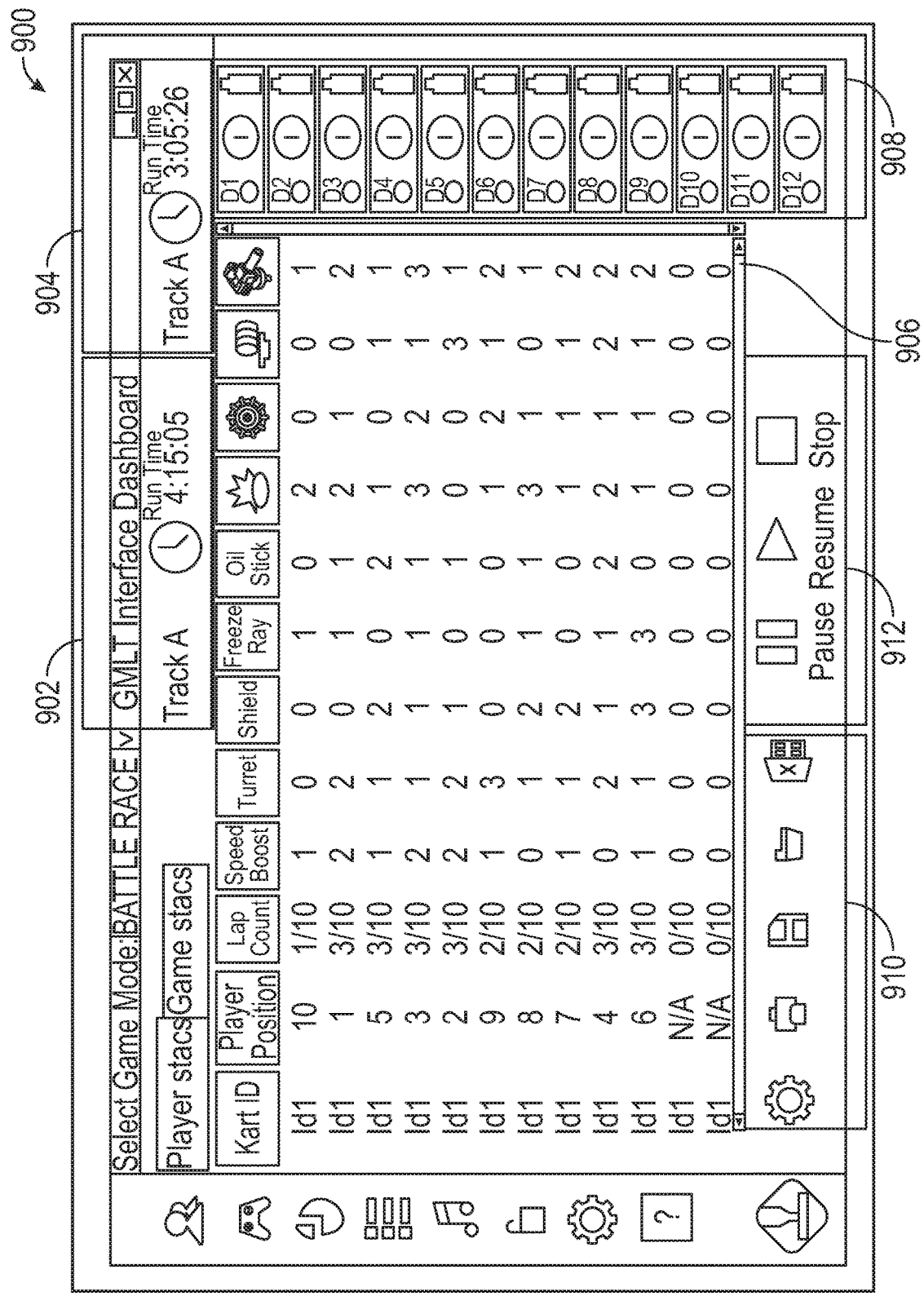
FIG. 9 illustrates a representative exemplary interface 900 of a master control system 108 that allows an administrator to control a gaming event, in accordance with one embodiment of the present invention.

FIG. 9 shows an exemplary interface 900 that an administrator can use to control the race and the simulated powers or weapons using master control system 108. Interface 900 is divided as first section 902, second section 904, third section 906, fourth section 908, fifth section 910, and sixth section 912.

First section 902 displays details of track 106 where the race is currently being held and the total time of the race that has passed or is remaining. Second section 904 displays details of another amusement track on which another race is currently being executed and the total time of the race that has passed or is remaining for another gaming event. In this manner, the administrator will be able to track and control multiple races using interface 900 of master control system 108.

Third section 906 displays the name of the players, amusement vehicle identity, the position of the player in the race, lap count, number of "Power-Ups", e.g. "Hyper Boosts", "Vortex Shields", "Turret Blasters", "Oils Slicks", "Freeze Ray Cannons", "Landmine" zones and potentially others acquired by each respective player.

Fourth section 908 displays the power status of the battery of each amusement vehicle. Fifth section 910 displays various functions such as save and print race details, and to modify settings related to the race and/or the interface. Sixth section 912 displays control tabs for allowing the administrator to pause, resume, and stop the race at any given point of time.

After completion of the race, points get awarded to each player. Each player gets a chance to accumulate the points upon completing multiple races. Master control system 108 stores the points accumulated by each player.

In one representative exemplary embodiment, points are awarded to the players for each race based on their order of completing the race.

The points distributed per race are shown below:

| | |
|---|---|
| 1st Player: | +100 Points |
| 2nd Player: | +80 Points |
| 3rd Player: | +60 Points |
| 4th Player: | +40 Points |
| 5th Player: | +20 Points |
| 6th Player: | 0 Points |
| 7th Player: | −10 Points |
| 8th Player: | −20 Points |
| 9th Player: | −30 Points |
| 10th Player: | −40 Points |
| 11th Player: | No action |
| 12th Player: | No action |

A person skilled in the art appreciates that additional points, achievements, and rewards can also be added to the driver's final statics. Further, players are ranked based on total points accumulated by them. A representative exemplary embodiment of ranking players is shown below:

TABLE #1

| Tier Level | Cadet Status | Points to Advance |
|---|---|---|
| 0 (Starting Rank) | Copper | 0 Points |
| 1 | Bronze | 20 Points |
| 2 | Silver | 200 Points |
| 3 | Gold | 500 Points |
| 4 | Diamond | 2000 Points |

In one embodiment, the performance of all players is displayed as a report, as shown in Table #2 below. The table noted below represents the percentages or chances the player receives "Power-Ups" or "perks", based on the player's current position during the race.

TABLE 2

| 1st place: | 2nd place: | 3rd place: |
|---|---|---|
| Turret Blasters: 10% | Turret Blasters: 10% | Turret Blasters: 10% |
| Vortex Shield: 20% | Vortex Shield: 20% | Vortex Shield: 20% |
| Hyper Boost: 10% | Hyper Boost: 10% | Hyper Boost: 10% |
| Freeze Ray Cannon: 10% | Freeze Ray Cannon: 10% | Freeze Ray Cannon: 10% |
| Trunk Buster: 15% | Trunk Buster: 15% | Trunk Buster: 15% |
| EMP: 15% | EMP: 15% | EMP: 15% |
| Mine Sweeper: 15% | Mine Sweeper: 15% | Mine Sweeper: 15% |
| 4th place: | 5th place: | 6th place: |
| Turret Blasters: 10% | Turret Blasters: 15% | Turret Blasters: 15% |
| Vortex Shield: 20% | Vortex Shield: 20% | Vortex Shield: 20% |
| Hyper Boost: 10% | Hyper Boost: 20% | Hyper Boost: 20% |
| Freeze Ray Cannon: 10% | Freeze Ray Cannon: 10% | Freeze Ray Cannon: 10% |
| Trunk Buster: 15% | Trunk Buster: 15% | Trunk Buster: 15% |
| EMP: 15% | EMP: 10% | EMP: 10% |
| Mine Sweeper: 15% | Mine Sweeper: 10% | Mine Sweeper: 10% |
| 7th place: | 8th place: | 9th place: |
| Turret Blasters: 15% | Turret Blasters: 20% | Turret Blasters: 20% |
| Vortex Shield: 20% | Vortex Shield: 10% | Vortex Shield: 10% |
| Hyper Boost: 20% | Hyper Boost: 30% | Hyper Boost: 30% |
| Freeze Ray Cannon: 10% | Freeze Ray Cannon: 10% | Freeze Ray Cannon: 10% |
| Trunk Buster: 15% | Trunk Buster: 15% | Trunk Buster: 15% |
| EMP: 10% | EMP: 10% | EMP: 10% |
| Mine Sweeper: 10% | Mine Sweeper: 5% | Mine Sweeper: 5% |
| 10th place: | | |
| Turret Blasters: 20% | | |
| Vortex Shield: 10% | | |
| Hyper Boost: 30% | | |
| Freeze Ray Cannon: 10% | | |
| Trunk Buster: 15% | | |
| EMP: 10% | | |
| Mine Sweeper: 5% | | |

FIG. 10 shows an exemplary interface 1000 providing gaming statistics that get displayed to a player operating an amusement vehicle after the race. Interface 1000 divides as first section 1002, second section 1004, third section 1006, fourth section 1008, and fifth section 1010. First section 1002 displays the name of the player/s, score achieved in the race, an identifier of the race, and a position secured by the player in the race. Second section 1004 displays a tier rank of the player/s. Third section 1006 displays statistics of different activities performed during the race, such as date and time of occurrence of the race, damages simulated to the amusement vehicle, and various simulated "Power-Ups" and weapons acquired during the race. Fourth section 1008 displays rankings of different players involved in the race and scores achieved by the players. Fifth section 1010 displays national rankings i.e. overall ranking of the different players determined based on their performance in all the gaming events in which they participated.

In one embodiment, processor 302 in conjunction with AVS 332 processes images and/or video and displays at each display screen 330 of amusement vehicles 102, 104 and transmits it any number of display devices (not specifically shown) placed outside track 106 e.g., in a lobby i.e. "Leader Board". For instance, processor 302 along with AVS 332 processes live feeds of the images or video as being captured by first camera 306 and second camera 334 and displays the images or live feed/s on to any number display devices. This provides a unique experience for spectators and/or those viewing via a social media channel/s to see how a player is doing while racing.

Figure 11:
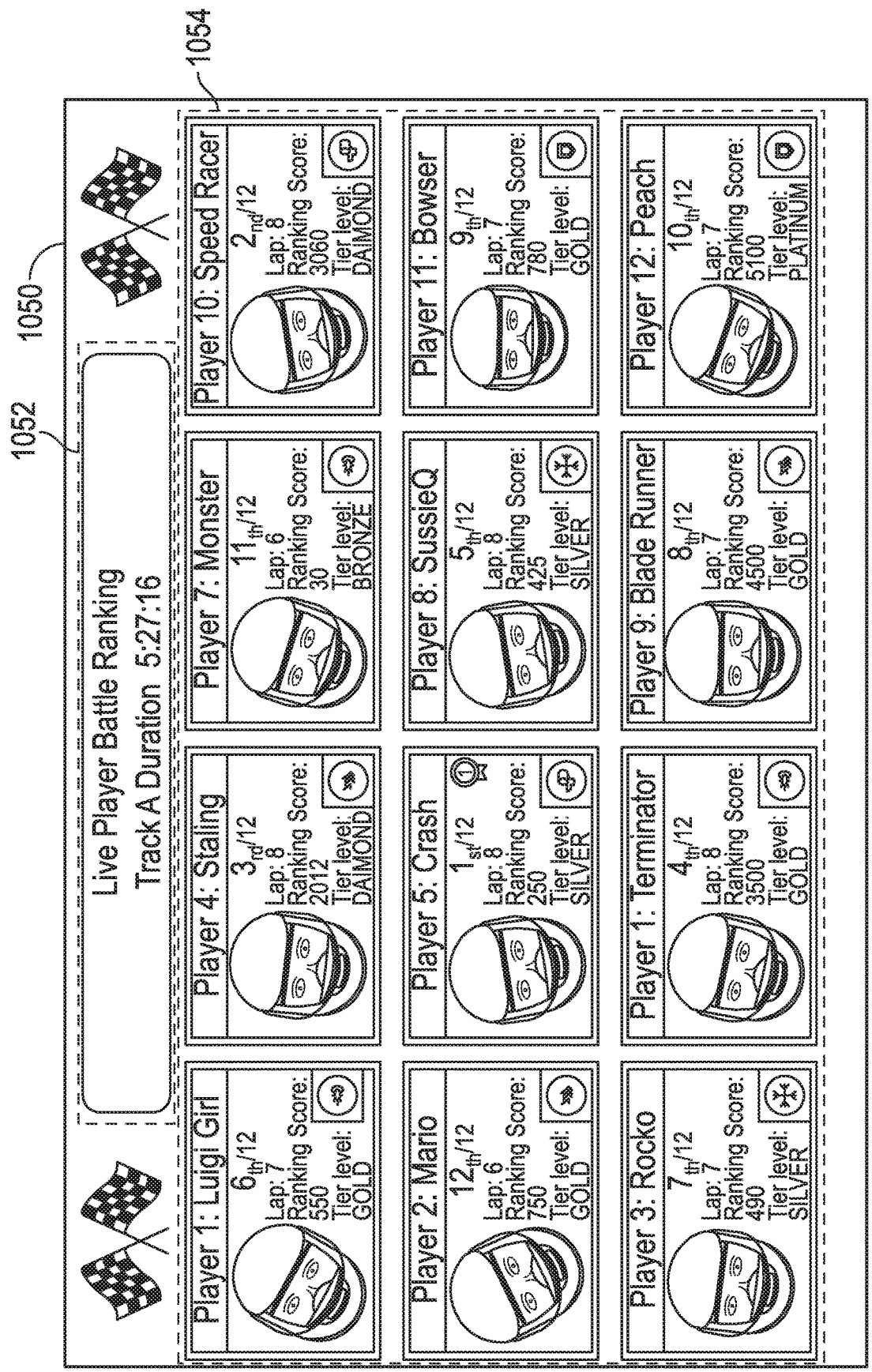
FIG. 11 illustrates a representative exemplary interface 1050 displaying live feed from each amusement vehicle at a display device placed outside of a track, in accordance with one embodiment of the present invention.

FIG. 11 shows an exemplary interface 1050 of the display device placed at the lobby for displaying live feed from each camera mounted at respective amusement vehicle. Interface 1050 includes a first section 1052 and a second section 1054. First section 1052 displays details of track 106 on which the race is currently being held and the total time of the race that has passed or is remaining. Second section 1054 displays live feed as being viewed by respective players on display screen 330 mounted at the amusement vehicles. In order to display the live feed from each amusement vehicle, processor 302 receives data from the amusement vehicles and transmits the data to the display device. Alternatively, second section 1054 displays the position of each player in the race, the number of laps completed, and his/her tier level during the race.

Further, second section 1054 displays the final results to show how each player performed at the end of the race. By displaying the live feed from the amusement vehicles and showing the performance of each player at the display device placed at the lobby, the present invention provides a unique experience for the spectators to spectate. It should be understood that interface 1050 is shown for illustrative purposes. A person skilled in the art will appreciate that interface 1050 displays other information such as a live feed from the front and rear camera of each amusement vehicle to further improve the viewing experience for spectators.

Figure 12A:
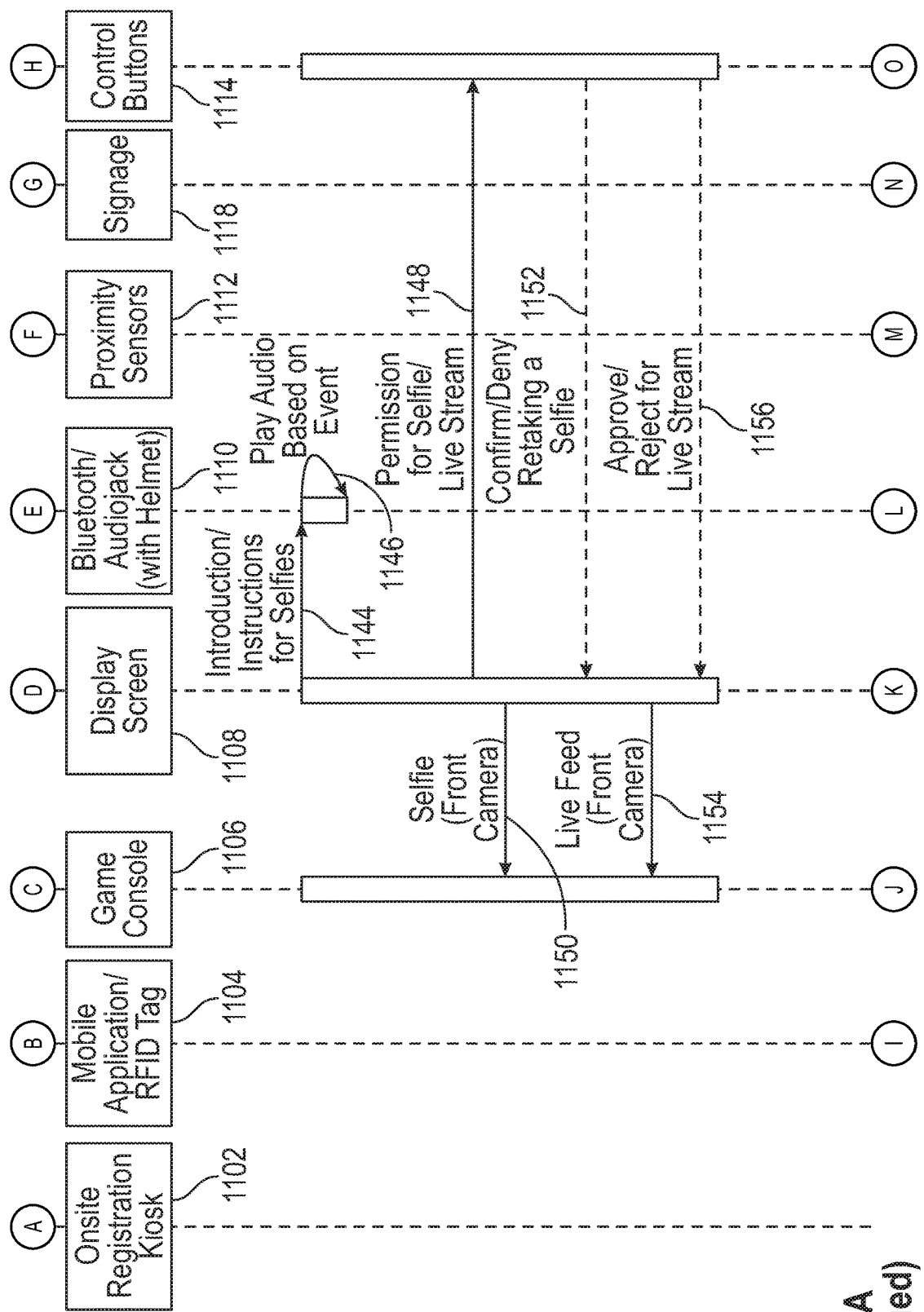
FIG. 12A and FIG. 12B cumulatively illustrate a representative example flow diagram comprising a sequence of steps occurring in the racing/gaming event, in accordance with one embodiment of the present invention.
Figure 12B:
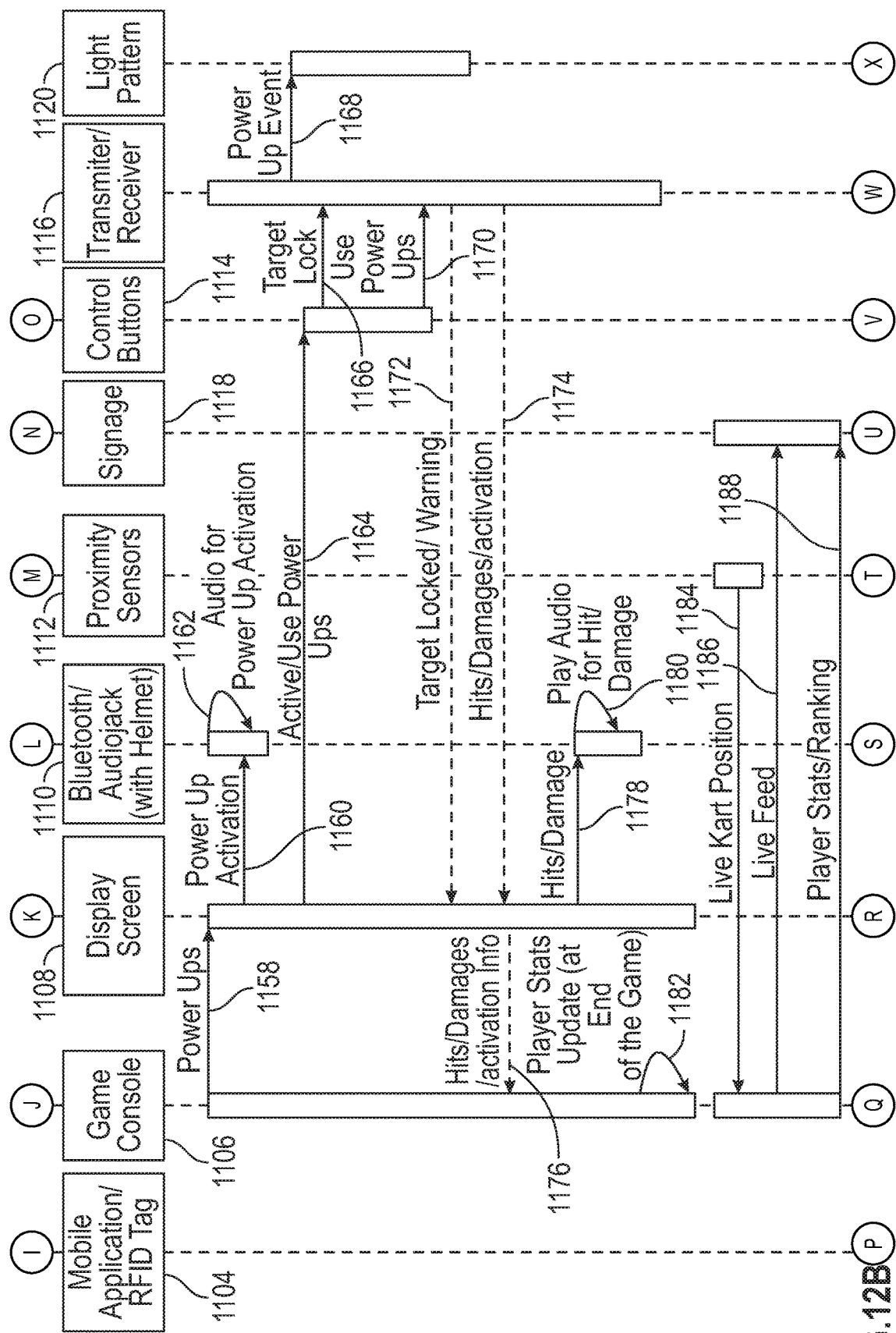
Figure 12B:
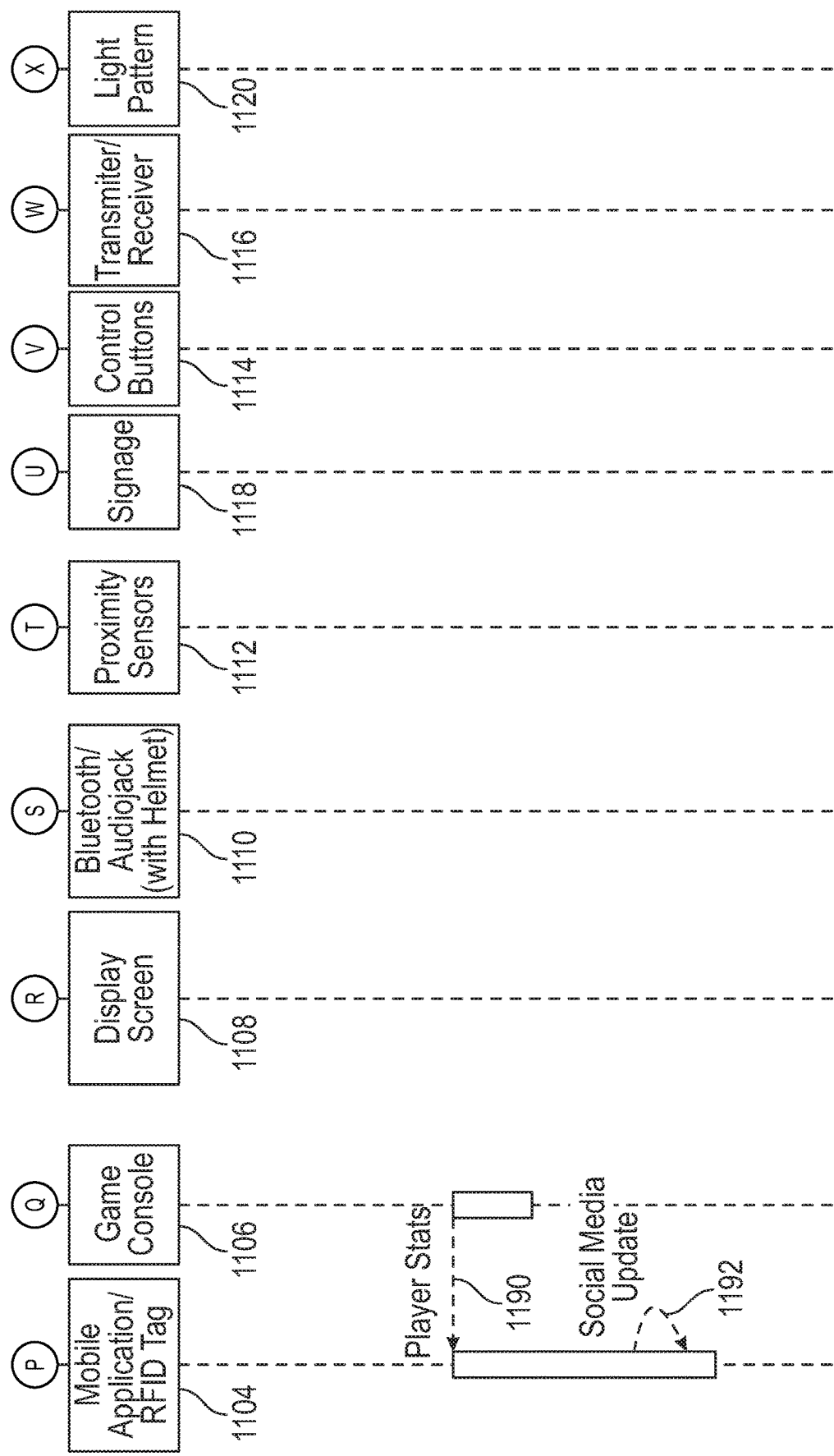

FIGS. 12A and 12B illustrate a flow diagram comprising a sequence of steps occurring in a gaming event, in accordance with one exemplary embodiment of the present invention. The order in which the flow diagram for simulating an amusement environment for gaming using amusement vehicles is described should not be construed as a limitation, and any number of the described method blocks can be combined in any order to implement the flow diagram or alternate methods. Additionally, individual blocks may be deleted from the flow diagram without departing from the spirit and scope of the subject matter described herein. Furthermore, the method can be implemented in any suitable hardware, software, firmware, or combination thereof. However, for ease of explanation, in the embodiments described below, the flow diagram might be implemented using the above-described amusement vehicle.

The flow diagram comprising a sequence of steps occurring in a race involves interaction between various elements such as an online registration kiosk 1102, a mobile application tied to and triggered through "RFID" tag 1104, dedicated "Proximity sensor, or similar sensor type, gaming event console 1106, display screen 1108, Bluetooth/audio jack 1110, proximity sensors 1112, real or virtual control buttons 1114, and an applicable sensor transmitter/receiver type 1116. The flow diagram also includes processes of a signage board 1118 and light pattern generation 1120.

At step 1130, a user or player registers himself using the online registration kiosk 1102. Alternatively, the user attempts to register himself using a gaming event console 1106, as shown in step 1132. Gaming event console 1106 refers to real or virtual control buttons provided on a steering wheel of an amusement vehicle. In response to the user's attempt to register, a unique code is sent to the online registration kiosk, as shown at step 1134. In addition, the user gets prompted to sign up to a mobile application and/or with an "RFID" tag or by way of an automated sequence triggered by the activation of a "Proximity" sensor, as shown at step 1136. Subsequently, a validation request gets transmitted from mobile application 1104 to gaming event console 1106, as shown at step 1136-1. Based on the user validation request, a "Quick Response" (QR) or another specific type of sensor and code gets communicated by gaming event console 1106 to the mobile application, at step 1136-2.

Subsequently, a "Quick Response" (QR) code, "RFID" tag 1104 code, or other "sensor-specific" codes gets transferred from the mobile application via an automated sequence. In one example, the "Proximity" sensor sends a code from mobile application 1104 to display screen 1108, at step 1138. In response to the sensor-specific code and amusement vehicle's identifier gets validated using gaming event console 1106 and display screen 1108, at step 1140. After validating, user account information gets created with the help of gaming event console 1106 and display screen 1108, at step 1142. At step 1130, a user or player registers himself using the online registration kiosk 1102. Alternatively, the user attempts to register himself using a gaming event console 1106, as shown in step 1132. Alternatively, at step 1130, a user or player registers himself using the online "Registration Kiosk" 1102. Alternatively, the user attempts to register himself using a gaming event console 1106, as shown in step 1132.

The user follows instructions provided to him to capture his image (selfie), at step 1144. The instructions come in the form of audio, at step 1146. Upon receiving the instructions, the user grants permission to capture his image and/or provides a live stream of his video, at step 1148. Subsequently, front camera 306 captures his image, at step 1150. The user clicks another image/selfie to confirm or deny a request to capture another selfie, at step 1152. Alternatively, front camera 306 and/or second camera 334 captures a video and utilizes AVS 332 to process the video for a live feed, at step 1154. The user approves or rejects a request for live streaming of the video, at step 1156.

upon initiating operation of the gaming event console 1106, the simulated "Power-Ups" weapons are provided to the user, at step 1158. Display screen 1108 presents the simulated "Power-Ups" or weapons acquired by the user, at step 1158. In one case, display screen 1108 displays instructions or suggestions to activate a power-up acquired by the user, at step 1160. Alternatively, an audio signal or audio alert indicating the user to activate the "Power-Up" is provided to the user, at step 1162. Based on the suggestion, the user activates a simulated "Power-Ups" or weapon using virtual or real control buttons 1114, at step 1164.

The user locks on and targets the amusement vehicle by orienting applicable sensor transmitter/receiver type 1116 through the operation of real or virtual control buttons 1114, at step 1166. Whenever a "Power-Up" event occurs, a light pattern is produced at display screen 1108 and or track, as shown at step 1168. Subsequently, the user operates real and/or virtual control buttons 1114 to utilize the simulated "Power-Ups" or weapon, as shown at step 1170.

When the user locks the applicable sensor type. (i.e. "Laser", "Ultra-Sonic" or other sensor type pulse onto another amusement vehicle or when another amusement vehicle aims his "Laser" or "Ultra-Sonic" or other sensor type pulse onto the user's amusement vehicle, display screen 1108 displays a warning message, at step 1172. Subsequently, a hit or damage taken by the user gets activated, at step 1174. Information about hits made by the user or damage taken by the user is displayed on the display screen 1108, at step 1176. Information about the hits or damages is transmitted to Bluetooth/audio jack 1110, at step 1178. The information about the hits or damages is displayed on display screen 1108, at step 1180. After the end of the race, statistics of the user's performance is displayed on the display screen 1108, at step 1182.

It should be understood that during the entire race, the position of the amusement vehicle is captured using "Proximity" sensor 1112, or a "GPS" enabled or similar device, at step 1184. A live feed of the user's video or the position is shared at the signage board 1118, at step 1186. Further, statistics related to the performance of all the users participating in the race and their ranking gets displayed at the signage board, at step 1188. The statistics are also shared on the mobile application, at step 1190. In one exemplary embodiment, the statistics such as result, rank, overall points, and tier rank of all users are shared on social media profiles of the users, at step 1192.

Using the above-described methods and amusement vehicles 102,104; users will have an improvised race experience. This is because; amusement vehicles 102, 104 configured with simulated "Power-Ups" and weapons allow them to race with other users on track and to score as many points as possible. The race leader or winner gets selected based on total points accumulated after completion of the race rather than simply who completed the race or defined laps in the predefined time. Further, as each event is captured such as locking or being locked on by another amusement vehicle 102, 104 with laser beams to slow down or to power up the speed will engage the users to race by avoiding coming in line of sight of the other amusement vehicles 102, 104.

Further, each amusement vehicle 102, 104 is provided with a display screen that is configured to show real-time player position, simulated "Power-Ups" and weapons, targeting tracking warnings and other notifications. Based on the information displayed and/or notified to the player, the player can maneuver amusement vehicle 102, 104 to avoid other amusement vehicles and race ahead on the track avoiding "RFID" tag 1104 or other sensor type enabled landmines to gain the advantage in the race.

In order to further enhance the race experience, the track provides various sensors fitted in strategic locations. Such as but not limited to "RFID" tags 104, "Proximity" sensor or an "Ultra-Sonic" sensor that are used as indicators of "Landmine" zones 112, "Pre-Designated" zones or obstacles to simulate damage or apply penalties to the amusement vehicle when the amusement vehicle enters a zone, runs over or trips a given sensor type or enters a "Pre-Designated" zones. This ensures a more competitive racing experience as it forces the users to be more aware of the track up ahead.

Figure 13:
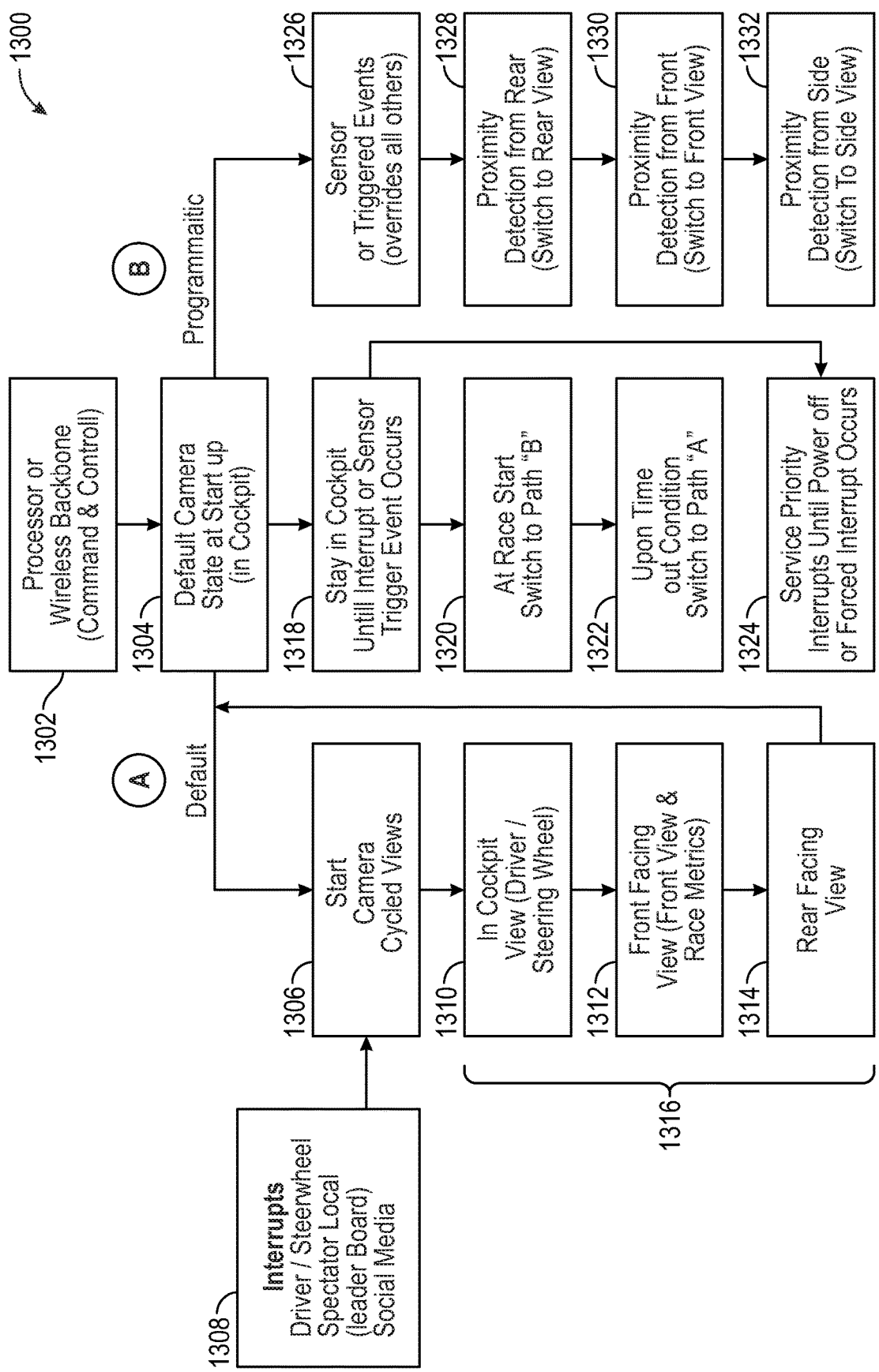
FIG. 13 illustrates a "Camera & Sensor Integration Work Flow" diagram detailing the default "Cycled Camera Views"

FIG. 13 shows a "Camera & Sensor Integration Work Flow" diagram 1300, in accordance with one embodiment of the present invention. The processor or wireless backbone command and control system 1302 sets a default camera state after starting amusement vehicle 102, 104. In default set up, display screen 330 shows cycled views of first camera 306 (1306). In the default setting, display screen 330 shows driver/steer wheel and spectator local or other options (1308). Further, processor 302 shows cockpit view (1310), front facing view (1312) and rear facing view (1314). Here, cockpit view (1310), front facing view (1312), and rear-facing view (1314) are considered as default cycled views set for display (1316) for one or more minutes intervals.

In default camera set up at startup (1304), display screen 330 displays cockpit until the default setting or sensor event is triggered (1318). Further, at race start, display screen 330 displays path "B" (1320). At the end of the race, display screen 330 switches to path "A" (1322). When at the default setting (1318), display screen 330 displays the same setting until any service priority interrupts occurs such as power off or forced shut down, etc. (1324).

In the program setting mode, display screen 330 displays an event when a sensor triggers an event (1326). For example, if any sensor detects that another amusement vehicle is approaching closer from rear, then processor 302 triggers display screen 330 to display rear view (1328). Similarly, if any sensor detects that another amusement vehicle is getting closer to other vehicle at the front, then processor 302 triggers display screen 330 to display front view (1330). Similarly, if any sensor detects the amusement vehicle is getting closer to other vehicle from sides, then processor 302 triggers display screen 330 to display side view (1332). A person skilled in the art appreciates that default "Cycled Camera Views" as well as the "manually" or "programmatically" generated interrupts change camera views based on the interrupt type.

FIG. 14 shows a programmatic flow of an Adaptive Video System (AVS) 1400 (similar to 332). As specified above, AVS 1400 (332) receives images or videos captured by first camera 306 and second camera 334 and processes using proprietary algorithms. As such, AVS 1400 receives images and/or videos captured by first camera 306 and second camera 334 and connects to social media and/or local race portals. Local race portals include leader board 1402a gets displayed by the trackside for spectators. Social media includes Facebook™ 1402b, Twitch™ 1402c, Instagram™ 1402d and others 1402e such as Twitter™. AVS 1400 processes the images and/or videos and reconfigures the output image/video based on its resolution, frame rate, bit rate, and depending on output medium (social media or leader board) 1404. For each of leader boards 1402a, Facebook™ 1402b, Twitch™ 1402c, Instagram™ 1402d and others 1402e, AVS 1400 configures the images/videos and transmits endpoint specific resolution or bit-rate to end-point display devices. Alternatively, AVS 1400 configures the images/videos and transmits as per endpoint specific resolution or bit rate overridden by user/administrator in the application (1406).

FIG. 15 illustrates a process flow 1500 of user accessing gaming events via an electronic device such as a mobile phone, in accordance with one exemplary embodiment of the present invention. Electronic device 1502 such as a mobile device operating any operating system, such as Andriod™ by Google™ or iOS™ by Apple Inc. includes a first interface 1504. Interface 1504 prompts the user to login (1506). After logging in, second interface 1508 prompts the user to select options (1510) e.g., to play a game virtually or view his profile. Once the user selects to play from the options provided (1510), third interface 1512 prompts the user to select and scan a QR code or barcode (1514) to register himself to participate in the game. Once the game begins, his score gets captured and transmitted to his electronic device 1502.

FIG. 16 illustrates an overall process flow of Go-Kart Mobile Laser Tag System (GMLTS) 1600, in accordance with one exemplary embodiment of the present invention. Here, GMLTS 1600 includes GMLTS administrator 1602, who manages one or more amusement vehicle tracks either directly or through a subscription model. GMLTS administrator 1602 builds and manages the software and/or hardware required to provide retrofittable kits for amusement vehicles to simulate power-ups, as explained above. GMLTS 1600 includes kart (amusement vehicle) owner/administrator 1604, who owns the track (physically or virtually) and one or more amusement vehicles. GMLTS 1600 includes mobile application 1606, which users download, register themselves with amusement vehicles to participate in the racing event. GMLTS 1600 includes mounted display screen 1608 (display screen 330) which the user sees at the steering wheel of the amusement vehicle. The flow diagram shows a sequence of steps during the interaction between GMLTS administrator 1602, kart (amusement vehicle) owner/administrator 1604, mobile application 1606, and mounted display screen 1608.

At step 1610, GMLTS administrator starts the process and logs-in to his portal (1612). GMLTS administrator 1602 manages user profiles such as kart (amusement vehicle) owner/administrators etc. (step 1614). At step 1616, GMLTS administrator 1602 manages subscription or one-time activation of kart (amusement vehicle) owner/administrators and manages each game data (1618). Specifically, GMLTS administrator 1602 manages and stores game controls (1620), game statistics (1622), and player statistics (1624) after each game/race. This process ends at step 1626.

At step 1628, kart (amusement vehicle) owner/administrator logs-in to access software-hardware controls developed by GMLTS administrator. Kart (amusement vehicle) owner/administrator 1604 manages user or players profiles such (step 1630). At step 1326, Kart (amusement vehicle) owner/administrator 1604 manages the user's subscription (1632) and his acceptance to participate and manage his data in the race (1634). Specifically, kart (amusement vehicle) owner/administrator 1604 manages and stores game controls (1636), player statistics (1637), game statistics (1638) and prints player statistics (1640). After each game/race, kart (amusement vehicle) owner/administrator 1604 kart (amusement vehicle) owner/administrator 1604 the players and/or game statistics on the signage/display board at track (1642). This process ends at step 1626.

At step 1644, the user signs up to participate in the race using a mobile application. Subsequently, the user syncs his mobile application with (amusement vehicle) owner/administrator 1604 and/or with amusement vehicle (1646). The user's mobile stores gaming data (1648) and this process ends at step 1426.

At step 1650, display screen 330 receives information corresponding to the user's registration. Display screen 330 prompts the user to take his selfie (1652) before participating in the game. Subsequently, display screen 330 displays the power-ups player would have received (1654). Display screen 330 shows any target tracking or any other warning notifications upon being locked by other amusement vehicles or upon being provided with power-ups during race (1656). If an amusement vehicle gets hit (1658), then display screen 330 shows the damage/impact taken by amusement vehicle (1660) and continues to display real-time data corresponding to the health of amusement vehicle (1662). If the amusement vehicle is not targeted or misses a target (1658), then display screen 330 shows no damage was done to amusement vehicle (1664) and continues to display real-time data corresponding to the health of amusement vehicle (1662). Display screen 330 displays real-time position (1666) of the player in the race, tier ranking (1668), post-game points (1670), and racing statistics (1672) during or after the race. This process ends at step 1626.

In the above description, the terms "Race"/"Gaming Event" are interchangeably used. A person skilled in the art will understand that the race or ride or gaming event indicates a competition where two or more people compete to complete a set task e.g., completion of ten laps in a track or circuit or taking maximum laps in a predefined period e.g., ten minutes.

Additionally, "Track Specific" modifications, such as but not limited to; "Split Track" courses, "Specialized Event" or "Action" Zones", to enable current or new "Power-Ups", awards, "earned" or "granted" capabilities may be incorporated over time.

The present invention comes as an aftermarket retrofittable hardware gamification attachment or built-in attachment kit for amusement vehicles. The retrofittable hardware gamification attachment various "Sensors Arrays", "Cameras", "Wireless Command & Control" system or processor, as well as a "Voice Recognition" system. The retrofittable hardware gamification attachment includes a "Mobile Application" capable of, but not limited to, register a user by way of wireless "Proximity" sensor or other sensor types with a given amusement vehicle and enable a feature-rich gaming and social media experience. This coupled with a low latency gamification method for amusement vehicles simulating but not limited to virtual "Power-Ups", "Weapons", "Damage", "Points", (i.e. for most laps led, fastest lap, etc.) "earned" and "acquired" Capabilities as well as other in race game "visual" and audio enhancements" add to the race and social media experience. The amusement vehicle retrofittable attachment kit includes various sensors, uniquely integrated, and consisting of but not limited to "Optical", "Proximity", "Ultra-Sonic", "Laser", sensors types configured with their applicable "Transmitters (TX)" and "Receivers (RX)". These devices pair with the applicable control modules and processor/s to provide enhanced amusement vehicle live-action racing and "gamification" experience. The present invention also allows race participants and the local audience members, spectators, and those that follow on the various social media platforms to be involved by way of viewing live-action kart racing, events, competitions, and interacting with the participants.

While "Preferred" or "Extraordinary" embodiments have been described above and illustrated in the accompanying drawings, it will be evident to those skilled in the art that modifications may be made without departing from this disclosure to support the "Entertainment" and the "Pro-Series" series competition versions of the race/game, further enhancing the overall experience. Such modifications are considered as possible variants comprised in the scope of the disclosure.

What is claimed is:

1. An amusement vehicle for simulating power-ups in-game virtual vehicle enhancements and virtual weaponry for improved racing experience, said amusement vehicle comprising:

sensor-specific transmitters that mount at a front end and a rear end of a frame housing of said amusement vehicle said sensor-specific transmitters configured for transmitting sensor-specific signals to communicate with other amusement vehicles moving in an amusement environment;

sensor-specific receivers that mount at said front end and rear end of said frame housing of said amusement vehicle, said sensor-specific receivers configured for receiving sensor-specific signals to communicate with other amusement vehicles; and a processor that communicatively connects to said sensor-specific transmitters and said sensor-specific receivers, said processor simulates power-ups in-game virtual vehicle enhancements and virtual weaponry for said amusement vehicle based on said sensor-specific signals transmitted or received from other amusement vehicles, wherein said processor simulates said power-ups in-game virtual vehicle enhancements and virtual weaponry by increasing or decreasing speed, causing damage, providing temporary protection from damage, freezing weaponry, and deactivating weaponry of said amusement vehicle for a pre-defined time corresponding to said sensor-specific signals transmitted or received from other amusement vehicles in a gaming event in said amusement environment.

2. The amusement vehicle of claim 1, wherein said amusement vehicle comprises a steering wheel, said steering wheel allows a user to maneuver said amusement vehicle in said amusement environment, wherein said steering wheel comprises a display screen configured to display in-game instructions, the position of the user in said gaming event, points scored by the user, images captured by cameras, power-ups and virtual weaponry activated or deactivated for said amusement vehicle during said gaming event.

3. The amusement vehicle of claim 2, wherein said display screen mounts via a dynamic mount, said dynamic mount creates a pendulum effect and keeps said display screen at a display surface level with the user's view.

4. The amusement vehicle of claim 2, wherein said display screen comprises audio and visual indicators for indicating sensor-specific signals transmitted or received from other amusement vehicles.

5. The amusement vehicle of claim 1, wherein said sensor-specific signals include one of the laser signals, optical signals, ultrasonic signals, and pulse signals.

6. The amusement vehicle of claim 1, further comprises Radio Frequency identification (RFID) tags or Proximity sensor tags placed at different locations on a track in said amusement environment, wherein said processor detects and simulates damage or applies penalties when said amusement vehicle runs over said RFID tags or Proximity sensor tags.

7. The amusement vehicle of claim 6, wherein said processor causes said amusement vehicle to slow down, come to a complete stop, or obtain a perk when said amusement vehicle runs over said RFID tags or said Proximity sensor tags.

8. The amusement vehicle of claim 2, wherein said steering wheel comprises haptic actuators, said haptic actuators cause said steering wheel to vibrate to indicate to the user of activation or deactivation of the simulated power-ups and virtual weaponry in said gaming event.

9. The amusement vehicle of claim 1, further comprises cameras configured for capturing still images or video of said amusement vehicle and surroundings of said amusement vehicle.

10. The amusement vehicle of claim 9, wherein said cameras comprises a 2-dimensional (2D) camera and a 3-dimensional (3D) 360-degree camera, said 2D camera mounts to a steering wheel of said amusement vehicle and said 3D 360-degree camera mounts to a roll cage structure of said frame housing.

11. The amusement vehicle of claim 9, further comprises an adaptive video system (AVS), said AVS in conjunction with said processor processes the still images and/or videos captured by said cameras.

12. The amusement vehicle of claim 11, wherein said AVS in conjunction with said processor processes and reconfigures resolution, frame rate and bit rate of the still images and/or videos for transmitting and displaying the still images and/or video on an electronic device or a display device external from said amusement environment.

13. The amusement vehicle of claim 2, wherein said display screen generates an interrupt type allowing the user to select a type of view to be displayed on said display screen.

14. The amusement vehicle of claim 12, further comprises a master control system that communicatively connects to said processor, said master control system receives the processed still images and/or videos from said AVS and displays on said display device external from said amusement environment.

15. A method implemented by an amusement vehicle for simulating power-ups in-game virtual vehicle enhancements and virtual weaponry for improved racing experience, said method comprising:
   transmitting and receiving sensor-specific signals for communicating with other amusement vehicles moving in an amusement environment; and
   simulating power-ups in-game virtual vehicle enhancements and virtual weaponry based on said sensor-specific signals transmitted or received from other amusement vehicles, wherein simulating power-ups and virtual weaponry is caused by increasing or decreasing speed, causing damage, providing temporary protection from damage, freezing weaponry, and deactivating weaponry said amusement vehicle for a pre-defined time corresponding to said sensor-specific signals transmitted or received from other amusement vehicles in a gaming event in said amusement environment.

16. The method of claim 15, further comprising displaying in-game instructions, the position of a user in said gaming event, points scored by the user, images captured by cameras, said power-ups, and virtual weaponry activated or deactivated for said amusement vehicle during said gaming event on a display screen.

17. The method of claim 15, further comprising capturing still images or video of said amusement vehicle and surroundings of said amusement vehicle.

18. The method of claim 17, further comprising processing the still images or video captured for transmitting and displaying the still images and/or video on an electronic device or a display device external from said amusement environment.

19. A retrofittable hardware gamification attachment for amusement vehicles for simulating power-ups in-game virtual vehicle enhancements and virtual weaponry for improved racing experience, said retrofittable hardware gamification attachment comprising:
   sensor-specific transmitters that mount at a front and a rear end of a frame housing of an amusement vehicle said sensor-specific transmitters configured for transmitting sensor-specific signals to communicate with other amusement vehicles moving in an amusement environment;
   sensor-specific receivers that mount at said front and rear end of said frame housing of said amusement vehicle, sensor-specific receivers configured for receiving sensor-specific signals to communicate with other amusement vehicles; and
   a processor that communicatively connects to said sensor-specific transmitters and said to sensor-specific receivers, said processor simulates power-ups in-game virtual vehicle enhancements and virtual weaponry for said amusement vehicle based on said sensor-specific signals transmitted or received from other amusement vehicles in said amusement environment,
   wherein said processor simulates power-ups in-game virtual vehicle enhancements and virtual weaponry by increasing or decreasing speed, causing damage, providing temporary protection from damage, freezing weaponry, and deactivating weaponry said amusement vehicle for a pre-defined time corresponding to said sensor-specific signals transmitted or received from other amusement vehicles in a gaming event in said amusement environment.

20. The retrofittable hardware gamification attachment of claim 19, further comprises cameras configured for capturing still images or video of said amusement vehicle and surroundings of said amusement vehicle, and
   wherein said retrofittable hardware gamification attachment further comprises adaptive video system (AVS) configured to process, transmit and display the still images and/or video on a display screen of said amusement vehicle and a display device external from said amusement environment.

* * * * *